(12) United States Patent
Merrow et al.

(10) Patent No.: US 7,920,380 B2
(45) Date of Patent: Apr. 5, 2011

(54) TEST SLOT COOLING SYSTEM FOR A STORAGE DEVICE TESTING SYSTEM

(75) Inventors: Brian S. Merrow, Harvard, MA (US); Nicholas C. Krikorian, Methuen, MA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 12/503,567

(22) Filed: Jul. 15, 2009

(65) Prior Publication Data

US 2011/0013362 A1 Jan. 20, 2011

(51) Int. Cl.
*H05K 7/20* (2006.01)
*G11B 33/14* (2006.01)

(52) U.S. Cl. .............. 361/695; 361/679.31; 361/679.33; 361/679.48; 361/679.49; 361/679.5; 361/724; 361/727; 165/121; 165/185; 360/97.01; 360/97.02; 374/141; 714/25; 714/42; 714/47

(58) Field of Classification Search ............. 361/679.31, 361/679.33, 679.37, 679.46, 679.47, 679.48, 361/679.49, 679.5, 690–697, 717–727; 324/73.1, 324/158.1; 702/69, 121, 185; 165/104.33, 165/104.34, 121–126, 185; 73/862.541, 73/865.6; 360/31, 71, 92.1, 97.02
See application file for complete search history.

(56) References Cited

U.S. PATENT DOCUMENTS

| | | |
|---|---|---|
| 557,186 A | 3/1896 | Cahill |
| 2,224,407 A | 12/1940 | Passur |
| 2,380,026 A | 7/1945 | Clarke |
| 2,631,775 A | 3/1953 | Gordon |
| 2,635,524 A | 4/1953 | Jenkins |
| 3,120,166 A | 2/1964 | Lyman |
| 3,360,032 A | 12/1967 | Sherwood |
| 3,364,838 A | 1/1968 | Bradley |
| 3,517,601 A | 6/1970 | Courchesne |
| 3,845,286 A | 10/1974 | Aronstein et al. |

(Continued)

FOREIGN PATENT DOCUMENTS

CN 1177187 3/1998

(Continued)

OTHER PUBLICATIONS

Abraham et al., "Thermal Proximity Imaging of Hard-Disk Substrates", IEEE Transactions on Mathematics 36:3997-4004, Nov. 2000.

(Continued)

*Primary Examiner* — Michael V Datskovskiy
(74) *Attorney, Agent, or Firm* — Fish & Richardson P.C.

(57) ABSTRACT

A test slot cooling system for a storage device testing system includes a storage device transporter having first and second portions. The first portion of the storage device transporter includes an air director and the second portion of the storage device transporter is configured to receive a storage device. The test slot cooling system includes a test slot housing defining an air entrance and a transporter opening for receiving the storage device transporter. The air entrance is in pneumatic communication with the air director of the received storage device transporter. The test slot cooling system also includes an air mover in pneumatic communication with the air entrance of the test slot housing for delivering air to the air director. The air director directs air substantially simultaneously over at least top and bottom surfaces of the storage device received in the storage device transporter.

22 Claims, 13 Drawing Sheets

U.S. PATENT DOCUMENTS

| | | |
|---|---|---|
| 4,147,299 A | 4/1979 | Freeman |
| 4,233,644 A | 11/1980 | Hwang et al. |
| 4,336,748 A | 6/1982 | Martin et al. |
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |
| 4,620,248 A | 10/1986 | Gitzendanner |
| 4,648,007 A | 3/1987 | Garner |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,851,965 A | 7/1989 | Gabuzda et al. |
| 4,881,591 A | 11/1989 | Rignall |
| 4,888,549 A * | 12/1989 | Wilson et al. ................ 324/73.1 |
| 4,911,281 A | 3/1990 | Jenkner |
| 4,967,155 A * | 10/1990 | Magnuson ................... 324/212 |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,237,484 A | 8/1993 | Ferchau et al. |
| 5,263,537 A | 11/1993 | Plucinski et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,477,416 A | 12/1995 | Schkrohowsky et al. |
| 5,484,012 A | 1/1996 | Hiratsuka |
| 5,486,681 A | 1/1996 | Dagnac et al. |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A * | 12/1997 | Chang ................... 361/679.31 |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,886,639 A | 3/1999 | Behl et al. |
| 5,890,959 A | 4/1999 | Pettit et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A * | 7/1999 | Lin ............................ 165/80.3 |
| 5,956,301 A | 9/1999 | Dimitri et al. |
| 5,959,834 A | 9/1999 | Chang |
| 5,999,356 A | 12/1999 | Dimitri et al. |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,066,822 A | 5/2000 | Nemoto et al. |
| 6,067,225 A | 5/2000 | Reznikov et al. |
| 6,069,792 A * | 5/2000 | Nelik ....................... 361/679.47 |
| 6,084,768 A | 7/2000 | Bolognia |
| 6,094,342 A | 7/2000 | Dague et al. |
| 6,104,607 A | 8/2000 | Behl |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,130,817 A | 10/2000 | Flotho et al. |
| 6,144,553 A | 11/2000 | Hileman et al. |
| 6,166,901 A | 12/2000 | Gamble et al. |
| 6,169,413 B1 * | 1/2001 | Paek et al. ..................... 324/760 |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,231,145 B1 | 5/2001 | Liu |
| 6,233,148 B1 * | 5/2001 | Shen ............................ 361/695 |
| 6,236,563 B1 | 5/2001 | Buican et al. |
| 6,247,944 B1 | 6/2001 | Bolognia et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |
| 6,272,767 B1 | 8/2001 | Botruff et al. |
| 6,281,677 B1 | 8/2001 | Cosci et al. |
| 6,282,501 B1 | 8/2001 | Assouad |
| 6,285,524 B1 | 9/2001 | Boigenzahn et al. |
| 6,289,678 B1 | 9/2001 | Pandolfi |
| 6,297,950 B1 | 10/2001 | Erwin |
| 6,298,672 B1 | 10/2001 | Valicoff, Jr. |

| | | | | | | |
|---|---|---|---|---|---|---|
| 6,302,714 B1 | 10/2001 | Bolognia et al. | | 6,976,190 B1 | 12/2005 | Goldstone |
| 6,304,839 B1 | 10/2001 | Ho et al. | | 6,980,381 B2 | 12/2005 | Gray et al. |
| 6,307,386 B1 | 10/2001 | Fowler et al. | | 6,982,872 B2 | 1/2006 | Behl et al. |
| 6,327,150 B1 | 12/2001 | Levy et al. | | 7,006,325 B2 | 2/2006 | Emberty et al. |
| 6,330,154 B1 | 12/2001 | Fryers et al. | | 7,039,924 B2 | 5/2006 | Goodman et al. |
| 6,351,379 B1 | 2/2002 | Cheng | | 7,054,150 B2 | 5/2006 | Orriss et al. |
| 6,354,792 B1 | 3/2002 | Kobayashi et al. | | 7,070,323 B2 | 7/2006 | Wanek et al. |
| 6,356,409 B1 | 3/2002 | Price et al. | | 7,076,391 B1 | 7/2006 | Pakzad et al. |
| 6,356,415 B1 | 3/2002 | Kabasawa | | 7,077,614 B1 | 7/2006 | Hasper et al. |
| 6,384,995 B1 | 5/2002 | Smith | | 7,088,541 B2 | 8/2006 | Orriss et al. |
| 6,388,437 B1* | 5/2002 | Wolski et al. ............... 324/158.1 | | 7,092,251 B2 | 8/2006 | Henry |
| 6,388,875 B1 | 5/2002 | Chen | | 7,106,582 B2 | 9/2006 | Albrecht et al. |
| 6,388,878 B1 | 5/2002 | Chang | | 7,123,477 B2 | 10/2006 | Coglitore et al. |
| 6,389,225 B1 | 5/2002 | Malinoski et al. | | 7,126,777 B2 | 10/2006 | Flechsig et al. |
| 6,411,584 B2 | 6/2002 | Davis et al. | | 7,130,138 B2 | 10/2006 | Lum et al. |
| 6,421,236 B1 | 7/2002 | Montoya et al. | | 7,134,553 B2 | 11/2006 | Stephens |
| 6,434,000 B1 | 8/2002 | Pandolfi | | 7,139,145 B1 | 11/2006 | Archibald et al. |
| 6,434,498 B1 | 8/2002 | Ulrich et al. | | 7,164,579 B2 | 1/2007 | Muncaster et al. |
| 6,434,499 B1 | 8/2002 | Ulrich et al. | | 7,167,360 B2 | 1/2007 | Inoue et al. |
| 6,464,080 B1 | 10/2002 | Morris et al. | | 7,181,458 B1 | 2/2007 | Higashi |
| 6,467,153 B2 | 10/2002 | Butts et al. | | 7,203,021 B1 | 4/2007 | Ryan et al. |
| 6,473,297 B1 | 10/2002 | Behl et al. | | 7,203,060 B2 | 4/2007 | Kay et al. |
| 6,473,301 B1 | 10/2002 | Levy et al. | | 7,206,201 B2* | 4/2007 | Behl et al. ................. 361/679.48 |
| 6,476,627 B1 | 11/2002 | Pelissier et al. | | 7,216,968 B2 | 5/2007 | Smith et al. |
| 6,477,044 B2 | 11/2002 | Foley et al. | | 7,219,028 B2 | 5/2007 | Bae et al. |
| 6,477,442 B1 | 11/2002 | Valerino, Sr. | | 7,219,273 B2 | 5/2007 | Fisher et al. |
| 6,480,380 B1 | 11/2002 | French et al. | | 7,227,746 B2 | 6/2007 | Tanaka et al. |
| 6,480,382 B2 | 11/2002 | Cheng | | 7,232,101 B2 | 6/2007 | Wanek et al. |
| 6,487,071 B1 | 11/2002 | Tata et al. | | 7,243,043 B2 | 7/2007 | Shin |
| 6,489,793 B2 | 12/2002 | Jones et al. | | 7,248,467 B2 | 7/2007 | Sri-Jayantha et al. |
| 6,494,663 B2 | 12/2002 | Ostwald et al. | | 7,259,966 B2 | 8/2007 | Connelly, Jr. et al. |
| 6,525,933 B2 | 2/2003 | Eland | | 7,273,344 B2 | 9/2007 | Ostwald et al. |
| 6,526,841 B1* | 3/2003 | Wanek et al. ................. 73/865.6 | | 7,280,353 B2 | 10/2007 | Wendel et al. |
| 6,535,384 B2 | 3/2003 | Huang | | 7,289,885 B2 | 10/2007 | Basham et al. |
| 6,537,013 B2 | 3/2003 | Emberty et al. | | 7,304,855 B1 | 12/2007 | Milligan et al. |
| 6,544,309 B1 | 4/2003 | Hoefer et al. | | 7,315,447 B2 | 1/2008 | Inoue et al. |
| 6,546,445 B1 | 4/2003 | Hayes | | 7,349,205 B2 | 3/2008 | Hall et al. |
| 6,553,532 B1 | 4/2003 | Aoki | | 7,353,524 B1 | 4/2008 | Lin et al. |
| 6,560,107 B1 | 5/2003 | Beck et al. | | 7,385,385 B2 | 6/2008 | Magliocco et al. |
| 6,565,163 B2 | 5/2003 | Behl et al. | | 7,395,133 B2 | 7/2008 | Lowe |
| 6,566,859 B2 | 5/2003 | Wolski et al. | | 7,403,451 B2 | 7/2008 | Goodman et al. |
| 6,567,266 B2 | 5/2003 | Ives et al. | | 7,437,212 B2 | 10/2008 | Farchmin et al. |
| 6,570,734 B2 | 5/2003 | Ostwald et al. | | 7,447,011 B2* | 11/2008 | Wade et al. ................. 361/679.33 |
| 6,577,586 B1 | 6/2003 | Yang et al. | | 7,457,112 B2 | 11/2008 | Fukuda et al. |
| 6,577,687 B2 | 6/2003 | Hall et al. | | 7,467,024 B2 | 12/2008 | Flitsch |
| 6,618,254 B2 | 9/2003 | Ives | | 7,476,362 B2 | 1/2009 | Angros |
| 6,626,846 B2* | 9/2003 | Spencer ........................ 600/538 | | 7,483,269 B1 | 1/2009 | Marvin, Jr. et al. |
| 6,628,518 B2* | 9/2003 | Behl et al. ................. 361/679.47 | | 7,505,264 B2 | 3/2009 | Hall et al. |
| 6,635,115 B1 | 10/2003 | Fairbairn et al. | | 7,554,811 B2* | 6/2009 | Scicluna et al. ................. 361/725 |
| 6,640,235 B1 | 10/2003 | Anderson | | 7,568,122 B2 | 7/2009 | Mechalke et al. |
| 6,644,982 B1 | 11/2003 | Ondricek et al. | | 7,570,455 B2 | 8/2009 | Deguchi et al. |
| 6,651,192 B1 | 11/2003 | Viglione et al. | | 7,573,715 B2 | 8/2009 | Mojaver et al. |
| 6,654,240 B1 | 11/2003 | Tseng et al. | | 7,584,851 B2 | 9/2009 | Hong et al. |
| 6,679,128 B2 | 1/2004 | Wanek et al. | | 7,612,996 B2 | 11/2009 | Atkins et al. |
| 6,693,757 B2 | 2/2004 | Hayakawa et al. | | 7,625,027 B2 | 12/2009 | Kiaie et al. |
| 6,741,529 B1 | 5/2004 | Getreuer | | 7,630,196 B2 | 12/2009 | Hall et al. |
| 6,746,648 B1 | 6/2004 | Mattila et al. | | 7,643,289 B2* | 1/2010 | Ye et al. ........................ 361/690 |
| 6,751,093 B1 | 6/2004 | Hsu et al. | | 7,646,596 B2* | 1/2010 | Ng ............................ 361/679.33 |
| 6,791,785 B1 | 9/2004 | Messenger et al. | | 2001/0006453 A1 | 7/2001 | Glorioso et al. |
| 6,791,799 B2 | 9/2004 | Fletcher | | 2001/0044023 A1 | 11/2001 | Johnson et al. |
| 6,798,651 B2 | 9/2004 | Syring et al. | | 2001/0046118 A1 | 11/2001 | Yamanashi et al. |
| 6,798,972 B1 | 9/2004 | Ito et al. | | 2001/0048590 A1 | 12/2001 | Behl et al. |
| 6,801,834 B1 | 10/2004 | Konshak et al. | | 2002/0030981 A1 | 3/2002 | Sullivan et al. |
| 6,806,700 B2 | 10/2004 | Wanek et al. | | 2002/0044416 A1 | 4/2002 | Harmon, III et al. |
| 6,811,427 B2 | 11/2004 | Garrett et al. | | 2002/0051338 A1 | 5/2002 | Jiang et al. |
| 6,826,046 B1 | 11/2004 | Muncaster et al. | | 2002/0071248 A1 | 6/2002 | Huang et al. |
| 6,830,372 B2 | 12/2004 | Liu et al. | | 2002/0079422 A1 | 6/2002 | Jiang |
| 6,832,929 B2 | 12/2004 | Garrett et al. | | 2002/0090320 A1 | 7/2002 | Burow et al. |
| 6,861,861 B2 | 3/2005 | Song et al. | | 2002/0116087 A1 | 8/2002 | Brown |
| 6,862,173 B1 | 3/2005 | Konshak et al. | | 2002/0161971 A1 | 10/2002 | Dimitri et al. |
| 6,867,939 B2 | 3/2005 | Katahara et al. | | 2002/0172004 A1 | 11/2002 | Ives et al. |
| 6,892,328 B2 | 5/2005 | Klein et al. | | 2003/0035271 A1 | 2/2003 | Lelong et al. |
| 6,904,479 B2 | 6/2005 | Hall et al. | | 2003/0043550 A1 | 3/2003 | Ives |
| 6,908,330 B2 | 6/2005 | Garrett et al. | | 2003/0206397 A1 | 11/2003 | Allgeyer et al. |
| 6,928,336 B2 | 8/2005 | Peshkin et al. | | 2004/0165489 A1 | 8/2004 | Goodman et al. |
| 6,937,432 B2 | 8/2005 | Sri-Jayantha et al. | | 2004/0230399 A1 | 11/2004 | Shin |
| 6,957,291 B2 | 10/2005 | Moon et al. | | 2004/0236465 A1 | 11/2004 | Butka et al. |
| 6,965,811 B2 | 11/2005 | Dickey et al. | | 2004/0264121 A1 | 12/2004 | Orriss et al. |
| 6,974,017 B2 | 12/2005 | Oseguera | | 2005/0004703 A1* | 1/2005 | Christie, Jr. .................... 700/214 |

| | | | | | | | |
|---|---|---|---|---|---|---|---|
| 2005/0010836 | A1* | 1/2005 | Bae et al. .................. 714/25 | EP | 741508 | 11/1996 | |
| 2005/0018397 | A1 | 1/2005 | Kay et al. | EP | 0757320 | 2/1997 | |
| 2005/0057849 | A1 | 3/2005 | Twogood et al. | EP | 0757351 | 2/1997 | |
| 2005/0069400 | A1 | 3/2005 | Dickey et al. | EP | 0840476 | 5/1998 | |
| 2005/0109131 | A1 | 5/2005 | Wanek et al. | EP | 1 045 301 A | 10/2000 | |
| 2005/0116702 | A1 | 6/2005 | Wanek et al. | EP | 1209557 | 5/2002 | |
| 2005/0131578 | A1 | 6/2005 | Weaver | EP | 1422713 | 5/2004 | |
| 2005/0179457 | A1 | 8/2005 | Min et al. | EP | 1234308 | 5/2006 | |
| 2005/0207059 | A1 | 9/2005 | Cochrane | EP | 1760722 | 3/2007 | |
| 2005/0219809 | A1* | 10/2005 | Muncaster et al. ............ 361/685 | EP | 1612798 | 11/2007 | |
| 2005/0225338 | A1 | 10/2005 | Sands et al. | GB | 2241118 | 8/1991 | |
| 2005/0270737 | A1 | 12/2005 | Wilson et al. | GB | 2276275 | 9/1994 | |
| 2006/0023331 | A1 | 2/2006 | Flechsig et al. | GB | 2299436 | 10/1996 | |
| 2006/0028802 | A1 | 2/2006 | Shaw et al. | GB | 2312984 | 11/1997 | |
| 2006/0066974 | A1 | 3/2006 | Akamatsu et al. | GB | 2328782 | 3/1999 | |
| 2006/0130316 | A1 | 6/2006 | Takase et al. | GB | 2439844 | 7/2008 | |
| 2006/0190205 | A1 | 8/2006 | Klein et al. | JP | 61-115279 | 6/1986 | |
| 2006/0227517 | A1 | 10/2006 | Zayas et al. | JP | 62-177621 | 8/1987 | |
| 2006/0250766 | A1 | 11/2006 | Blaalid et al. | JP | 62-239394 | 10/1987 | |
| 2006/0269384 | A1 | 11/2006 | Kiaie et al. | JP | 62-251915 | 11/1987 | |
| 2007/0034368 | A1 | 2/2007 | Atkins et al. | JP | 63-002160 | 1/1988 | |
| 2007/0035874 | A1 | 2/2007 | Wendel et al. | JP | 63-004483 | 1/1988 | |
| 2007/0035875 | A1 | 2/2007 | Hall et al. | JP | 63-016482 | 1/1988 | |
| 2007/0053154 | A1 | 3/2007 | Fukuda et al. | JP | 63-062057 | 3/1988 | |
| 2007/0082907 | A1 | 4/2007 | Canada et al. | JP | 63-201946 | 8/1988 | |
| 2007/0127202 | A1* | 6/2007 | Scicluna et al. ............ 361/685 | JP | 63-214972 | 9/1988 | |
| 2007/0127206 | A1 | 6/2007 | Wade et al. | JP | 63-269376 | 11/1988 | |
| 2007/0195497 | A1 | 8/2007 | Atkins | JP | 63-195697 | 12/1988 | |
| 2007/0248142 | A1 | 10/2007 | Rountree et al. | JP | 64-089034 | 4/1989 | |
| 2007/0253157 | A1 | 11/2007 | Atkins et al. | JP | 2-091565 | 3/1990 | |
| 2007/0286045 | A1 | 12/2007 | Onagi et al. | JP | 2-098197 | 4/1990 | |
| 2008/0007865 | A1 | 1/2008 | Orriss et al. | JP | 2-185784 | 7/1990 | |
| 2008/0030945 | A1 | 2/2008 | Mojaver et al. | JP | 2-199690 | 8/1990 | |
| 2008/0112075 | A1* | 5/2008 | Farquhar et al. .......... 360/97.02 | JP | 2-278375 | 11/1990 | |
| 2008/0239564 | A1* | 10/2008 | Farquhar et al. .......... 360/97.02 | JP | 2-297770 | 12/1990 | |
| 2008/0282275 | A1 | 11/2008 | Zaczek et al. | JP | 3-008086 | 1/1991 | |
| 2008/0282278 | A1 | 11/2008 | Barkley | JP | 3-078160 | 4/1991 | |
| 2009/0028669 | A1 | 1/2009 | Rebstock | JP | 3-105704 | 5/1991 | |
| 2009/0082907 | A1 | 3/2009 | Stuvel et al. | JP | 3-207947 | 9/1991 | |
| 2009/0122443 | A1 | 5/2009 | Farquhar et al. | JP | 3-210662 | 9/1991 | |
| 2009/0142169 | A1 | 6/2009 | Garcia et al. | JP | 3-212859 | 9/1991 | |
| 2009/0153992 | A1 | 6/2009 | Garcia et al. | JP | 3-214490 | 9/1991 | |
| 2009/0153993 | A1 | 6/2009 | Garcia et al. | JP | 3-240821 | 10/1991 | |
| 2009/0153994 | A1 | 6/2009 | Merrow | JP | 3-295071 | 12/1991 | |
| 2009/0175705 | A1 | 7/2009 | Nakao et al. | JP | 4-017134 | 1/1992 | |
| 2009/0261047 | A1 | 10/2009 | Merrow | JP | 4-143989 | 5/1992 | |
| 2009/0261228 | A1 | 10/2009 | Merrow | JP | 4-172658 | 6/1992 | |
| 2009/0261229 | A1 | 10/2009 | Merrow | JP | 4-214288 | 8/1992 | |
| 2009/0262444 | A1 | 10/2009 | Polyakov et al. | JP | 4-247385 | 9/1992 | |
| 2009/0262445 | A1 | 10/2009 | Noble et al. | JP | 4-259956 | 9/1992 | |
| 2009/0262454 | A1 | 10/2009 | Merrow | JP | 4-307440 | 10/1992 | |
| 2009/0262455 | A1 | 10/2009 | Merrow | JP | 4-325923 | 11/1992 | |
| 2009/0265032 | A1 | 10/2009 | Toscano et al. | JP | 5-035053 | 2/1993 | |
| 2009/0265043 | A1 | 10/2009 | Merrow | JP | 5-035415 | 2/1993 | |
| 2009/0265136 | A1 | 10/2009 | Garcia et al. | JP | 5-066896 | 3/1993 | |
| 2009/0297328 | A1* | 12/2009 | Slocum, III .................. 414/806 | JP | 5-068257 | 3/1993 | |
| | | | | JP | 5-073566 | 3/1993 | |
| | FOREIGN PATENT DOCUMENTS | | | JP | 5-073803 | 3/1993 | |
| | | | | JP | 5-101603 | 4/1993 | |
| CN | 2341188 | 9/1999 | | JP | 5-173718 | 7/1993 | |
| CN | 1114109 | 7/2003 | | JP | 5-189163 | 7/1993 | |
| CN | 1192544 | 3/2005 | | JP | 5-204725 | 8/1993 | |
| DE | 3786944 | 11/1993 | | JP | 5-223551 | 8/1993 | |
| DE | 69111634 | 5/1996 | | JP | 6-004220 | 1/1994 | |
| DE | 69400145 | 10/1996 | | JP | 6-004981 | 1/1994 | |
| DE | 19701548 | 8/1997 | | JP | 6-162645 | 6/1994 | |
| DE | 19804813 | 9/1998 | | JP | 6-181561 | 6/1994 | |
| DE | 69614460 | 6/2002 | | JP | 6-215515 | 8/1994 | |
| DE | 69626584 | 12/2003 | | JP | 6-274943 | 9/1994 | |
| DE | 19861388 | 8/2007 | | JP | 6-314173 | 11/1994 | |
| EP | 0210497 | 7/1986 | | JP | 7-007321 | 1/1995 | |
| EP | 0242970 | 10/1987 | | JP | 7-029364 | 1/1995 | |
| EP | 0 277 634 A | 8/1988 | | JP | 7-037376 | 2/1995 | |
| EP | 0356977 | 8/1989 | | JP | 7-056654 | 3/1995 | |
| EP | 0442642 | 2/1991 | | JP | 7-111078 | 4/1995 | |
| EP | 0466073 | 7/1991 | | JP | 7-115497 | 5/1995 | |
| EP | 0776009 | 11/1991 | | JP | 7-201082 | 8/1995 | |
| EP | 0582017 | 2/1994 | | JP | 7-226023 | 8/1995 | |
| EP | 0617570 | 9/1994 | | JP | 7-230669 | 8/1995 | |
| EP | 0635836 | 1/1995 | | | | | |

| | | |
|---|---|---|
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007293936 A * | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 2/1989 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.

Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.

Anderson et al., "Clinical chemistry: concepts and applications", The McGraw-Hill Companies, Inc., pp. 131-132, 2003.

Anderson et al., "High Reliability Variable Load Time Controllable Vibration Free Thermal Processing Environment", Delphion, hhttps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Bakken et al., "Low Cost, Rack Mounted, Direct Access Disk Storage Device", www.ip.com, 4 pages, Mar. 3, 2005.

Biber et al., "Disk Drive Drawer Thermal Management", Advances in Electronic Packaging vol. 1:43-46, 1995.

Christensen, "How Can Great firms Fail? Insights from the hard Disk Drive Industry", Harvard Business School Press, pp. 1-26, 2006.

Chung et al., "Vibration Absorber for Reduction of the In-plane Vibration in an Optical Disk Drive", IEEE Transactions on Consumer Electronics, Vo. 48, May 2004.

Curtis et al., "InPhase Professional Archive Drive Architecture" Dec. 17, 2007 http://www.science.edu/TechoftheYear/Nominees/InPhase/Holographic%20Storage.pdf.

Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.

FlexStar Technology, 30E/Cascade Users Manual, Doc #98-36387-00 Rev. 1.8, pp. 1-33.

FlexStar Technology, "A World of Storage (1999) Testing Solutions," http://www.flexstar.com, 1 page (1999).

FlexStar Technology, "Environment Chamber Products," http://www.flexstar.com, 1 page (1999).

FlexStar Technology, "FlexStar's Family of Products," http://www.flexstar.com, 1 page (1999).

Frankovich, "The Basics of Vibration Isolation Using Elastomeric Materials", EARSC, 2005 http://www.isoloss.com/pdfs/engineering/BasicsofVibrationIsolation.pdf.

Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.

Gurumurthi et al., "Disk Drive Roadmap from the Thermal Perspective: A Case for Dynamic Thermal Management", International Symposium on Computer Architecture, Proceedings of the 32$^{nd}$ Annual International Symposium on Computer Architecture, IEEE Computer Society, pp. 38-49, 2005 http://portal.acm.org/citation.cfm?id=1069807.1069975.

Gurumurthi, "The Need for temperature-Aware Storage Systems", The Tenth Intersociety conference on Thermal and Thermomechanical Phenomena in Electronics, ITHERM pp. 387-394, 2006.

Gurumurthi et al., "Thermal Issues in Disk Drive Design: Challenges and Possible Solutions", ACM Transactions on Storage 2:41-73, Feb. 2006.

Haddad et al., "A new Mounting Adapter For Computer Peripherals with Improved Reliability, Thermal Distribution, Low Noise and Vibration Reduction", ISPS, Advances in Information Storage and Processing Systems, 1:97-108, 1995.

Henderson, "HAD High Aerial Densities Require Solid Test Fixtures", Flexstar Technology.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP-vol. 19-2, Advances in Electronic Packaging, vol. 2:2203-2208, ASME 1997.

Johnson et al., "Performance Measurements of Tertiary Storage Devices", Proceedings of the 24$^{th}$ VLDB Conference, New York, pp. 50-61, 1998.

Ku, "Investigation of Hydrodynamic Bearing Friction in Data Storage information System Spindle Motors", ISPSvol. 1, Advances in Information Storage and Processing Systems, pp. 159-165, ASME 1995.

Lindner, "Disk drive mounting", IBM Technical Disclosure Brochure, vol. 16, No. 3, pp. 903-904, Aug. 1973.

McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.

Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.

Morris, "Zero Cost Power and Cooling Monitor System", www.delphion.com/tdbs/tdb?order=94A+61950, 3 pages, Jan. 15, 2008.

Nagarajan, "Survey of Cleaning and cleanliness Measurement in Disk Drive Manufacture", North Carolina Department of Environment and Natural Resources, Feb. 1997.

Notification of Transmittal of the International Search Report and the Written Opinion of the International Searching Authority, or the Declaration, PCT/US2008/086181, 15 pages, Mar. 16, 2009.

Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.

Prater et al., "Thermal and Heat-Flow Aspects of Actuators for Hard Disk Drives", InterSociety Conference on Thermal Phenomena, pp. 261-268, 1994.

Ruwart et al., "Performance Impact of External Vibration on Consumer-grade and enterprise-class Disk Drives", Proceedings of the 22$^{nd}$ IEEE/13$^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", In FAST'07: 5$^{th}$ USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS-vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk drive Analyzer Product Literature, date accessed Jan. 28, 2009, 2 pages.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single cell—Production Test Systems" www.xyratex.com/products/production-test-systems/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISCKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.

Annex to Form PCT/ASA/206 Communication Relating to the Results of the Partial International Search, for International Application No. PCT/US2008/086814, dated Apr. 3, 2009, 5 pages.

Annex to Form PCT/ASA/206 Communication Relating to the Results of the Partial International Search, for International Application No. PCT/US2008/086809, dated Apr. 3, 2009, 1 page.

Notification of Transmittal of the International Search Report and the Written Opinion of the International Searching Authority, or the Declaration, for International Application No. PCT/US2009/039926, Sep. 1, 2009, 13 pages.

Notification of Transmittal of the International Search Report and the Written Opinion of the International Searching Authority, or the Declaration, for International Application No. PCT/US2009/039591, Aug. 31, 2009, 10 pages.

Notification of Transmittal of the International Search Report and the Written Opinion of the International Searching Authority, or the Declaration, for International Application No. PCT/US2008/086814, Sep. 18, 2009, 17 pages.

Notification of Transmittal of the International Search Report and the Written Opinion of the International Searching Authority, or the Declaration, for International Application No. PCT/US2009/039888, Sep. 28, 2009, 13 pages.

Notification of Transmittal of the International Search Report and the Written Opinion of the International Searching Authority, or the Declaration, for International Application No. PCT/US2009/039921, Sep. 25, 2009, 14 pages.

Notification of Transmittal of the International Search Report and the Written Opinion of the International Searching Authority, or the Declaration, for International Application No. PCT/US2009/040058, Sep. 29, 2009, 13 pages.
Notification of Transmittal of the International Search Report and the Written Opinion of the International Searching Authority, or the Declaration, for International Application No. PCT/US2009/040829, Oct. 28, 2009, 13 pages.
Notification of Transmittal of the International Search Report and the Written Opinion of the International Searching Authority, or the Declaration, for International Application No. PCT/US2009/039590, Oct. 30, 2009, 10 pages.
Notification of Transmittal of the International Search Report and the Written Opinion of the International Searching Authority, or the Declaration, for International Application No. PCT/US2009/040835, Oct. 30, 2009, 13 pages.
Notification of Transmittal of the International Search Report and the Written Opinion of the International Searching Authority, or the Declaration, for International Application No. PCT/US2009/040757, Nov. 23, 2009, 12 pages.
Notification of Transmittal of the International Search Report and the Written Opinion of the International Searching Authority, or the Declaration, for International Application No. PCT/US2009/039898, Nov. 24, 2009, 12 pages.
Notification of Transmittal of the International Search Report and the Written Opinion of the International Searching Authority, or the Declaration, for International Application No. PCT/US2009/040795, Nov. 26, 2009, 13 pages.
Notification of Transmittal of the International Search Report and the Written Opinion of the International Searching Authority, or the Declaration, for International Application No. PCT/US2009/045583, Nov. 27, 2009, 13 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040894, Dec. 22, 2009, 12 pages.
Notification of Transmittal of the International Search Report and the Written Opinion of the International Searching Authority, or the Declaration, for International Application No. PCT/US2009/039934, Dec. 23, 2009, 12 pages.
Notification of Transmittal of the International Search Report and the Written Opinion of the International Searching Authority, or the Declaration, for International Application No. PCT/US2009/040965, Dec. 23, 2009, 12 pages.
Notification of Transmittal of the International Search Report and the Written Opinion of the International Searching Authority, or the Declaration, for International Application No. PCT/US2009/040973, Jan. 11, 2010, 13 pages.
Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/424,980. The foregoing U.S. patent application is a continuation of U.S. Appl. No. 12/104,536.
Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,801. The foregoing U.S. patent application is a continuation of U.S. Appl. No. 12/424,980.
Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388.
Cardinal Intellectual Property's search report including the results of a search for the features of the claims included in the U.S. patent application entitled "Bulk Feeding Disk Drives to Disk Drive Testing Systems", inventors: Noble et al., and having assigned U.S. Appl. No. 12/726,856. The foregoing U.S. patent application is a continuation of U.S. Appl. No. 12/104,869.
Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069.
Cardinal Intellectual Property's search report including the results of a search for the features of the claims included in the U.S. patent application entitled "Vibration Isolation Within Disk Drive Testing Systems," inventors: Brian S. Merrow and having assigned U.S. Appl. No. 12/767,142. The foregoing U.S. patent application is a continuation of U.S. Appl. No. 12/105,105. Revised as of Mar. 30, 2010.
Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/767,113. The foregoing U.S. patent application is a continuation of U.S. Appl. No. 11/959,133.
Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/766,680. The foregoing U.S. patent application is a continuation of U.S. Appl. No. 11/959,133. Revised as of Apr. 1, 2010.
Office Action from corresponding U.S. Appl. No. 12/727,700, dated May 6, 2010.
Accelerated Examination Support Document from corresponding U.S. Appl. No. 12/727,700, filed Mar. 19, 2010.
Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567.
Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575.
Cardinal Intellectual Property's search report including the results of a search for the features of the claims included in the U.S. patent application entitled "Conductive Heating", inventors: Brian S. Merrow et al., and having assigned U.S. Appl. No. 12/760,164. The foregoing U.S. patent application is a continuation of U.S. Appl. No. 12/503,593.
Cardinal Intellectual Property's search report including the results of a search for the features of the claims included in the U.S. patent application entitled "Conductive Temperature Sensing", inventors: Brian S. Merrow et al., and having assigned U.S. Appl. No. 12/760,305. The foregoing U.S. patent application is a continuation of U.S. Appl. No. 12/503,687.
Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. Appl. No. 12/105,103.
Cardinal Intellectual Property's search report including the results of a search for the features of the claims included in the U.S. patent application entitled "Single Test Slot for Dynamic Isolation of Hard Drive", inventors: Brian S. Merrow and having assigned U.S. Appl. No. 12/767,142. The foregoing U.S. patent application is a continuation of U.S. Appl. No. 12/105,105.

* cited by examiner

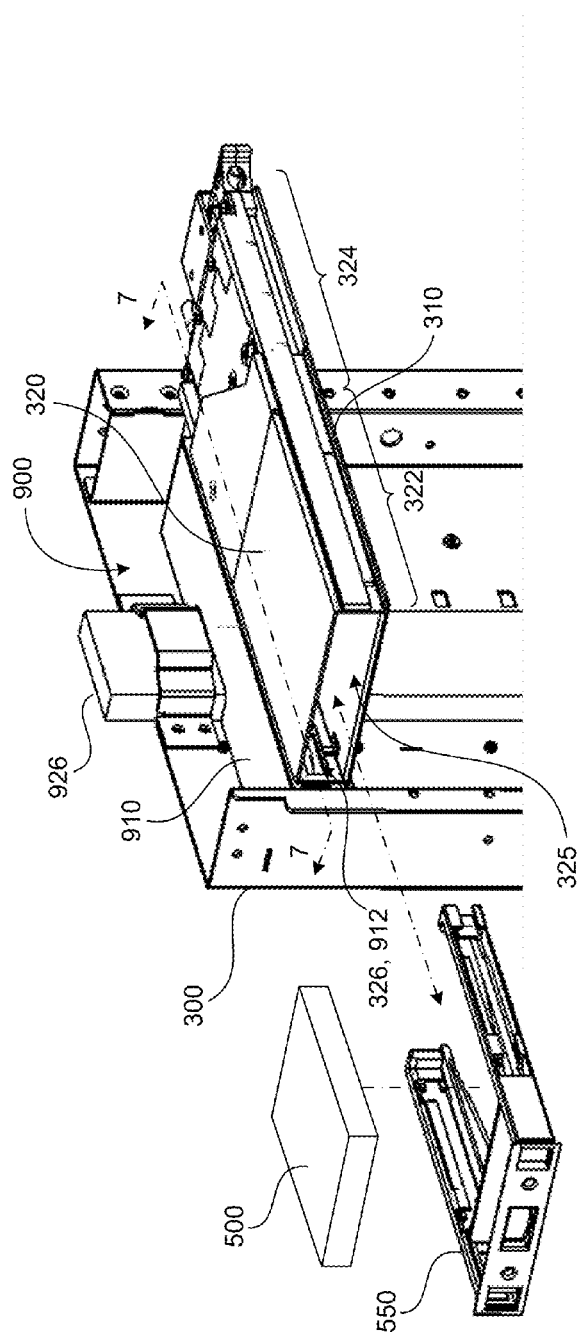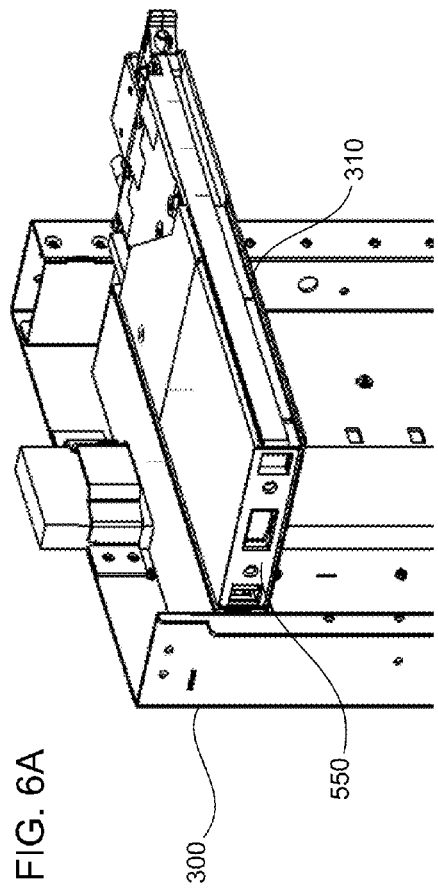

TEST SLOT COOLING SYSTEM FOR A STORAGE DEVICE TESTING SYSTEM

TECHNICAL FIELD

This disclosure relates to test slot cooling systems for a storage device testing system.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously in batches. Disk drive testing systems typically include one or more racks having multiple test slots that receive disk drives for testing.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower test yields and increased manufacturing costs.

During the manufacture of disk drives or other storage devices, it is common to control the temperature of the storage devices, e.g., to ensure that the storage devices are functional over a predetermined temperature range. For this reason, the testing environment immediately around the storage devices is closely regulated. Minimum temperature fluctuations in the testing environment can be critical for accurate test conditions and for safety of the storage devices. In some known testing systems, the temperature of plural disk drive devices is adjusted by using cooling or heating air which is common to all of the disk drive devices.

SUMMARY

One aspect of the disclosure a test slot cooling system for a storage device testing system includes a storage device transporter having first and second portions. The first portion of the storage device transporter includes an air director and the second portion of the storage device transporter is configured to receive a storage device. The test slot cooling system includes a test slot housing defining an air entrance and a transporter opening for receiving the storage device transporter. The air entrance is in pneumatic communication with the air director of the received storage device transporter. The test slot cooling system also includes an air mover in pneumatic communication with the air entrance of the test slot housing for delivering air to the air director. The air director directs air substantially simultaneously over at least top and bottom surfaces of the storage device received in the storage device transporter.

Implementations the disclosure may include one or more of the following features. In some implementations, the air director includes an air entrance and first and second air exits. The air director directs air received through its air entrance out the first and second air exits. The storage device has top, bottom, front, rear, right, and left side surfaces, and is received with its rear surface substantially facing the first portion of the storage device transporter. The first air exit directs air over at least the bottom surface of the received storage device and the second air exit directs air over at least the top surface of the received storage device. In some implementations, the air director defines a cavity in pneumatic communication with the air entrance and air exits of the air director. The air director includes a plenum disposed in the cavity for directing at least a portion of the air received in the cavity out of the first air exit. In some examples, the plenum comprises a weight weighted to reduce movement of the storage device transporter in the test slot housing.

In some implementations, the second portion of the storage device transporter comprises first and second arms configured to receive a storage device. The second portion of the storage device transporter may include a clamping system for releasably engaging a received storage device.

In some implementations, the test slot cooling system includes a cooling system housing disposed adjacent to the test slot housing. The cooling system housing has an air entrance in pneumatic communication with the air exit of the test slot housing and an air exit in pneumatic communication with the air entrance of the test slot housing. The air mover is disposed in the cooling system housing and circulates air received through the cooling system housing air entrance out of the cooling system housing air exit. The air moves along a closed loop path through the test slot housing and the cooling system housing. In some examples, the air mover includes an air entrance and an air exit, which is in pneumatic communication with the cooling system housing air exit. The air mover receives air along a first direction through its air entrance and delivers air out of its air exit along a second direction substantially perpendicular to the first direction. The air mover may have an air mover body having a width of about 45 mm, a length of about 45 mm, and a height of about 10 mm. In some examples, the air mover is configured to produce an air flow rate of up to about 0.122 m3/min (4.308 CFM) and an air pressure of up to about 20.88 mmH2O (0.822 inchH2O).

The test slot cooling system, in some implementations, includes an air cooler in pneumatic communication with the air mover. The air cooler includes an air cooler body and at least one fin disposed on the air cooler body. The at least one fin cools air passing over it. The air cooler can be disposed in the cooling system housing upstream of the air mover, the air mover moving the air between the test slot housing and the cooling system housing in a closed loop path Another aspect of the disclosure is a test slot cooling system for a storage device testing system that includes a test slot housing defining an air entrance and a device opening for receiving a storage device. The test slot cooling system includes an air mover disposed exterior of the test slot housing and in pneumatic communication with the air entrance of the test slot housing for delivering air to the received storage device. The air mover includes an air entrance and an air exit, which is in pneumatic communication with the air entrance of the test slot housing. The air mover receives air along a first direction through its air entrance and delivering air out of its air exit along a second direction substantially perpendicular to the first direction.

Implementations the disclosure may include one or more of the following features. In some implementations, the slot cooling system includes a cooling system housing disposed adjacent to the test slot housing. The cooling system housing has an air entrance in pneumatic communication with an air exit of the test slot housing and an air exit in pneumatic communication with the air entrance of the test slot housing. The air mover is disposed in the cooling system housing and circulates air received through the cooling system housing air entrance out of the cooling system housing air exit. The air moves along a closed loop path through the test slot housing and the cooling system housing. In some examples, the air mover includes an air mover body having a width of about 45 mm, a length of about 45 mm, and a height of about 10 mm. The test air mover may be configured to produce an air flow rate of up to about 0.122 m3/min (4.308 CFM) and an air pressure of up to about 20.88 mmH2O (0.822 inchH2O). In some examples, the test slot cooling system includes an air cooler in pneumatic communication with the air mover. The air cooler includes an air cooler body and at least one fin disposed on the air cooler body, where the at least one fin cools air passing over it.

Yet another aspect of the disclosure is a storage device transporter for a storage device testing system that includes a body having first and second portions. The first body portion includes an air director and the second body portion is configured to receive a storage device having top, bottom, front, rear, right, and left side surfaces. The storage device is received with its rear surface substantially facing the first body portion. The air director receives a flow of air and directs the air flow substantially simultaneously over at least the top and bottom surfaces of the received storage device.

Implementations the disclosure may include one or more of the following features. In some implementations, the air director includes an air entrance and first and second air exits. The air director directs air received through the air entrance out the first and second air exits. The first air exit directs air over at least the bottom surface of the received storage device and the second air exit directs air over at least the top surface of the received storage device. In some examples, the air director defines a cavity in pneumatic communication with the air entrance and air exits. The air director includes a plenum disposed in the cavity for directing at least a portion of the air received in the cavity out of the first air exit. The plenum may be or include a weight weighted to reduce movement of the storage device transporter while received by the storage device testing system. In some implementations, the second body portion of the storage device transporter includes a clamping system for releasably engaging a received storage device.

Another aspect of the disclosure is a method of regulating the temperature of a storage device received in a storage device testing system. The method includes delivering a flow of air into an air entrance of a test slot housing and directing the air flow substantially simultaneously over at least top and bottom surfaces of the storage device.

Implementations the disclosure may include one or more of the following features. In some implementations, the method includes delivering the air flow to an air director that directs the air flow over at least the top and bottom surfaces of the storage device. The method may include supporting the storage device in a storage device transporter received in the test slot housing. The storage device transporter has first and second portions. The first storage device transporter portion includes the air director and the second storage device transporter portion is configured to receive the storage device. The storage device has top, bottom, front, rear, right, and left side surfaces and is received in the storage device transporter with its rear surface substantially facing the first body portion.

In some implementations, the method includes weighting the air director to reduce movement of the storage device transporter while received by the storage device testing system (e.g., while received in a test slot of the storage device testing system). The method may include delivering the air flow into an air entrance of the air director. The air director directs the air received through the air entrance out first and second air exits of the air director. The first air exit directs air over at least the bottom surface of the received storage device and the second air exit directs air over at least the top surface of the received storage device. In some examples, the air director defines a cavity in pneumatic communication with the air entrance and air exits of the air director. The air director includes a plenum disposed in the cavity for directing at least a portion of the air received in the cavity out of the first air exit. The method may include weighting the plenum to reduce movement of the storage device transporter while received by the storage device testing system.

In some implementations, the method includes directing the flow of air to an air mover in pneumatic communication with the air entrance of a test slot housing. The air mover delivers the flow of air into the air entrance of a test slot housing. The air flow moves along a closed loop path. The method may include receiving the flow of air into the air mover along a first direction and delivering the air flow to the air entrance of the test slot housing along a second direction substantially perpendicular to the first direction. In some examples, the method includes directing the flow of air over an air cooler disposed in the air flow path upstream of the air mover. In some implementations, the method includes delivering the air flow into the air entrance of the test slot housing at an air flow rate of up to about 0.122 m3/min (4.308 CFM) and an air pressure of up to about 20.88 mmH2O (0.822 inchH2O).

The details of one or more implementations of the disclosure are set forth in the accompanying drawings and the description below. Other features, objects, and advantages will be apparent from the description and drawings, and from the claims.

DESCRIPTION OF DRAWINGS

FIGS. 6A and 6B are perspective views of a storage device transporter carrying a storage device being received inserted into a test slot of a storage device testing system.

Like reference symbols in the various drawings indicate like elements.

DETAILED DESCRIPTION

Temperature regulation of a storage device can be an important factor during testing (e.g., validation, qualification, functional testing, etc.) of the storage device. One method of performing temperature regulation includes moving air over and/or about the storage device during testing. As will be discussed in detail, the volume, temperature, and flow path of the air moved with respect to the storage device during testing, inter alia, can each be factors in providing reliable, effective, and efficient temperature control of the storage device.

A storage device, as used herein, includes disk drives, solid state drives, memory devices, and any device that requires asynchronous testing for validation. A disk drive is generally a non-volatile storage device which stores digitally encoded data on rapidly rotating platters with magnetic surfaces. A solid-state drive (SSD) is a data storage device that uses solid-state memory to store persistent data. An SSD using SRAM or DRAM (instead of flash memory) is often called a RAM-drive. The term solid-state generally distinguishes solid-state electronics from electromechanical devices.

Figure 1:
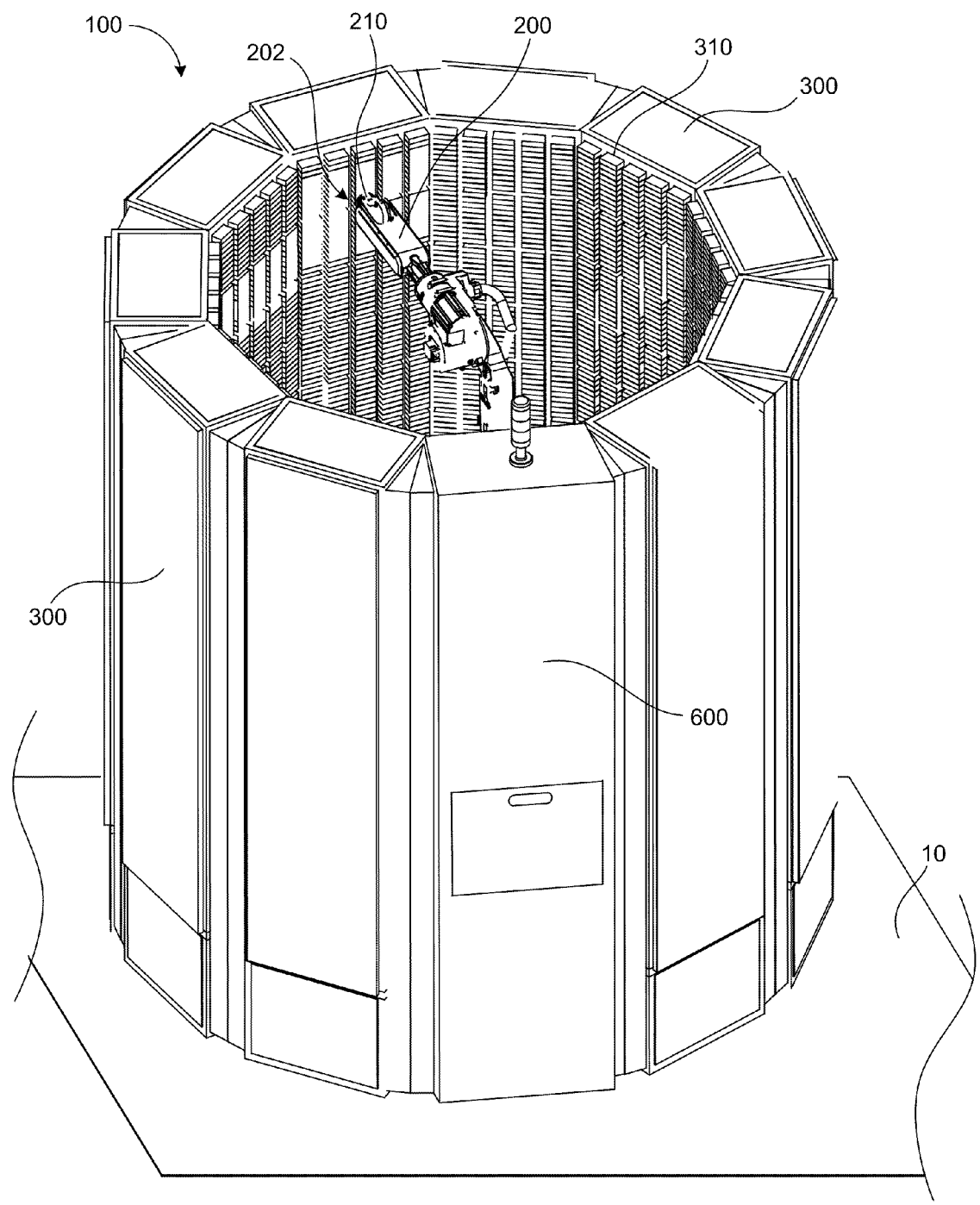
FIG. 1 is a perspective view of a storage device testing system having racks arranged in a substantially circular configuration.
Figure 2:
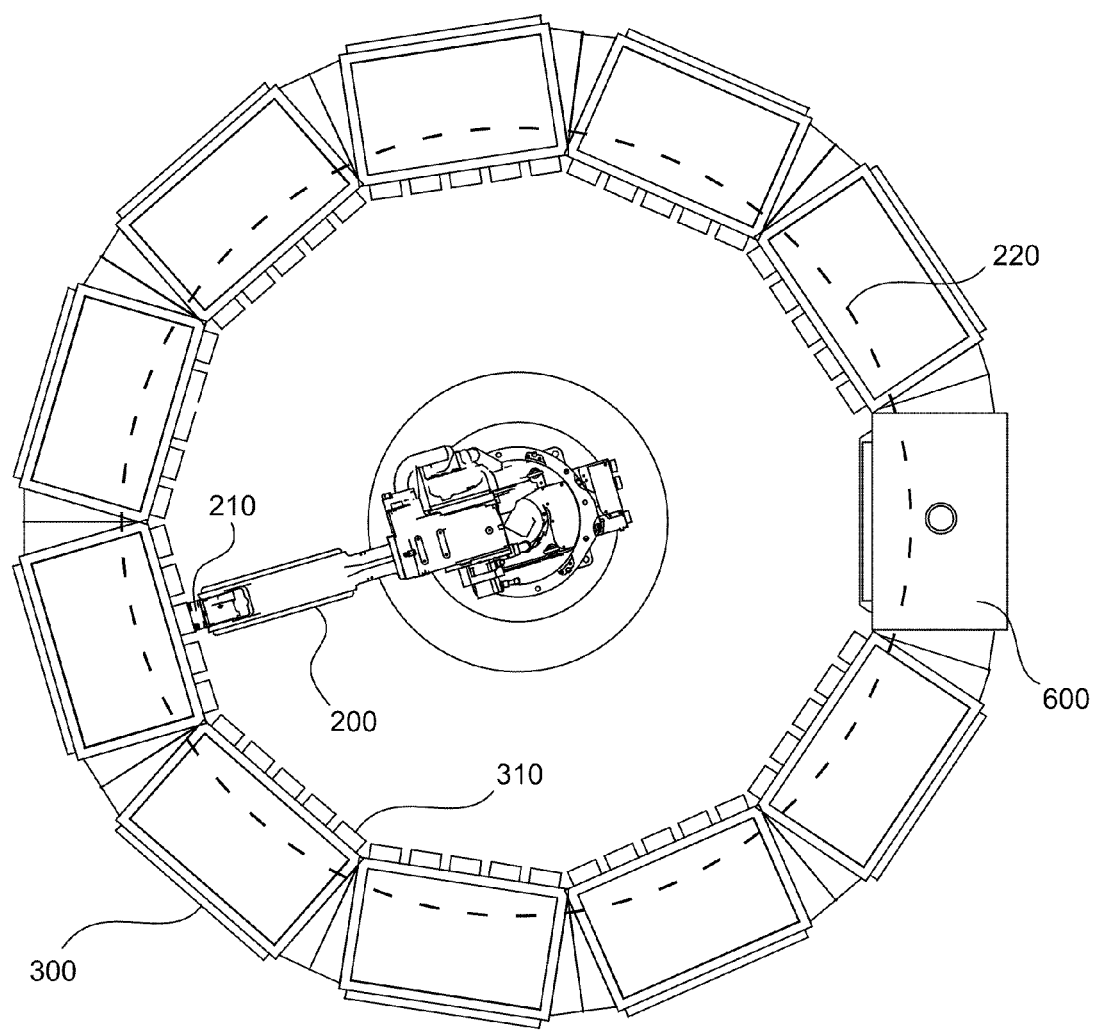
FIG. 2 is a top view of the storage device testing system shown in FIG. 1.
Figure 3:
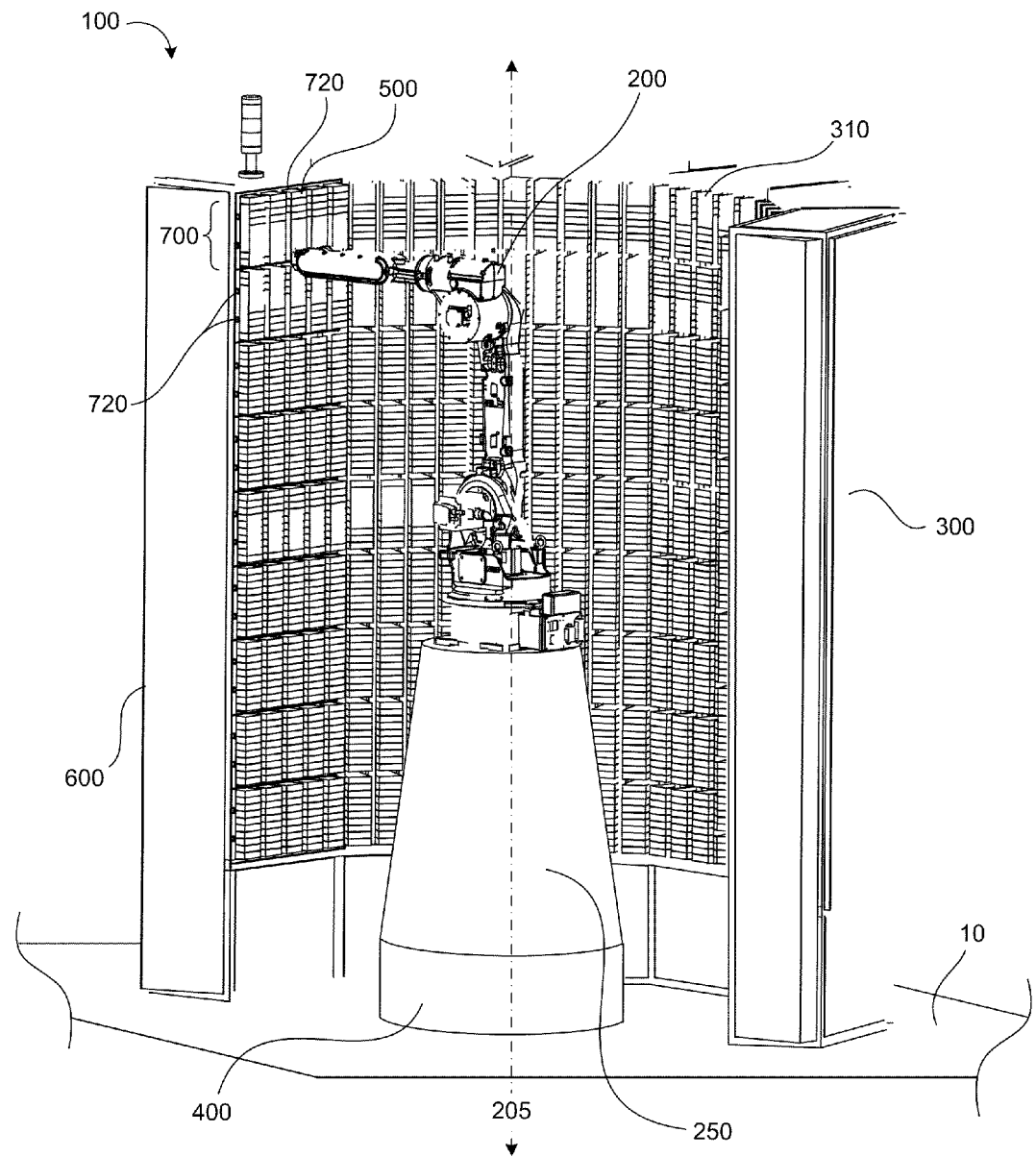
FIG. 3 is a perspective view of a storage device testing system and a transfer station.

Referring to FIGS. 1-3, in some implementations, a storage device testing system 100 includes at least one automated transporter 200 (e.g. robotic arm, gantry system, or multi-axis linear actuator) defining a first axis 205 (see FIG. 3) substantially normal to a floor surface 10. In the examples shown, the automated transporter 200 comprises a robotic arm 200 operable to rotate through a predetermined arc about the first axis 205 and to extend radially from the first axis 205. The robotic arm 200 is operable to rotate 360° about the first axis 205 and includes a manipulator 210 disposed at a distal end 202 of the robotic arm 200 to handle one or more storage devices 500 and/or storage device transporters 550 to carry the storage devices 500 (see e.g., FIGS. 5-6). Multiple racks 300 are arranged around the robotic arm 200 for servicing by the robotic arm 200. Each rack 300 houses multiple test slots 310 configured to receive storage devices 500 for testing. The robotic arm 200 defines a substantially cylindrical working envelope volume 220, with the racks 300 being arranged within the working envelope 220 for accessibility of each test slot 310 for servicing by the robotic arm 200. The substantially cylindrical working envelope volume 220 provides a compact footprint and is generally only limited in capacity by height constraints. In some examples, the robotic arm 200 is elevated by and supported on a pedestal or lift 250 on the floor surface 10. The pedestal or lift 250 increases the size of the working envelope volume 220 by allowing the robotic arm 200 to reach not only upwardly, but also downwardly to service test slots 310. The size of the working envelope volume 220 can be further increased by adding a vertical actuator to the pedestal or lift 250. A controller 400 (e.g., computing device) communicates with each automated transporter 200 and rack 300. The controller 400 coordinates servicing of the test slots 310 by the automated transporter(s) 200.

The robotic arm 200 is configured to independently service each test slot 310 to provide a continuous flow of storage devices 500 through the testing system 100. A continuous flow of individual storage devices 500 through the testing system 100 allows random start and stop times for each storage device 500, whereas other systems that require batches of storage devices 500 to be run all at once as an entire testing loaded must all have the same start and end times. Therefore, with continuous flow, storage devices 500 of different capacities can be run at the same time and serviced (loaded/unloaded) as needed.

Figure 4:
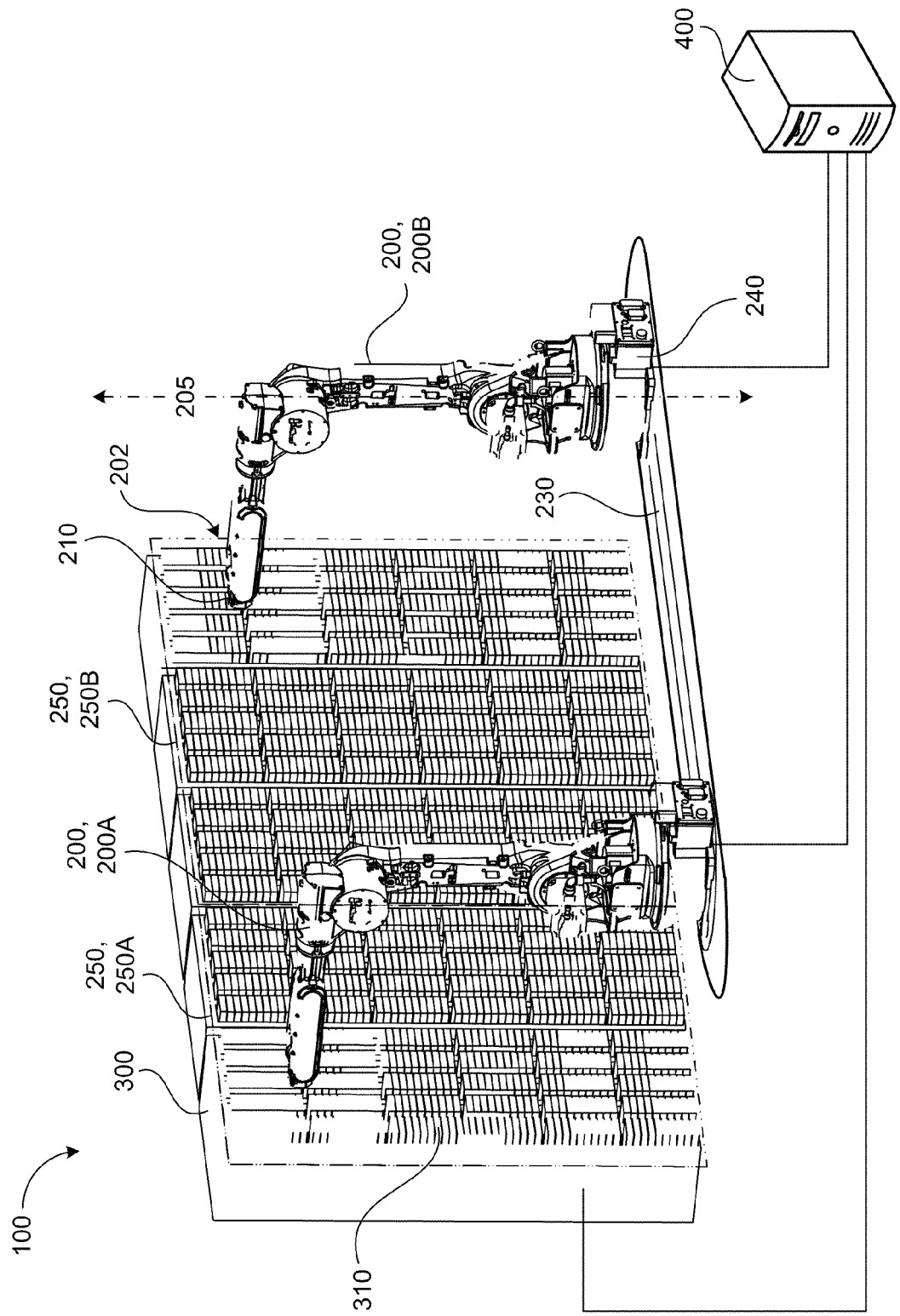
FIG. 4 is a perspective view of a storage device testing system having racks arranged substantially in a row.

Referring to FIGS. 3-4, the storage device testing system 100 includes a transfer station 600 configured for bulk feeding of storage devices 500 to the robotic arm 200. The robotic arm 200 independently services each test slot 310 by transferring a storage device 500 between the transfer station 600 and the test slot 310. The transfer station 600 houses one or more totes 700 carrying multiple storage devices 500 presented for servicing by the robotic arm 200. The transfer station 600 is a service point for delivering and retrieving storage devices 500 to and from the storage device testing system 100. The totes 700 allow an operator to deliver and retrieve a collection of storage devices 500 to and from the transfer station 600. In the example shown in FIG. 3, each tote 700 is accessible from respective tote presentation support systems 620 in a presentation position and may be designated as a source tote 700 for supplying a collection of storage devices 500 for testing or as a destination tote 700 for receiving tested storage devices 500 (or both). Destination totes 700 may be classified as "passed return totes" or "failed return totes" for receiving respective storage devices 500 that have either passed or failed a functionality test, respectively.

Figure 5:
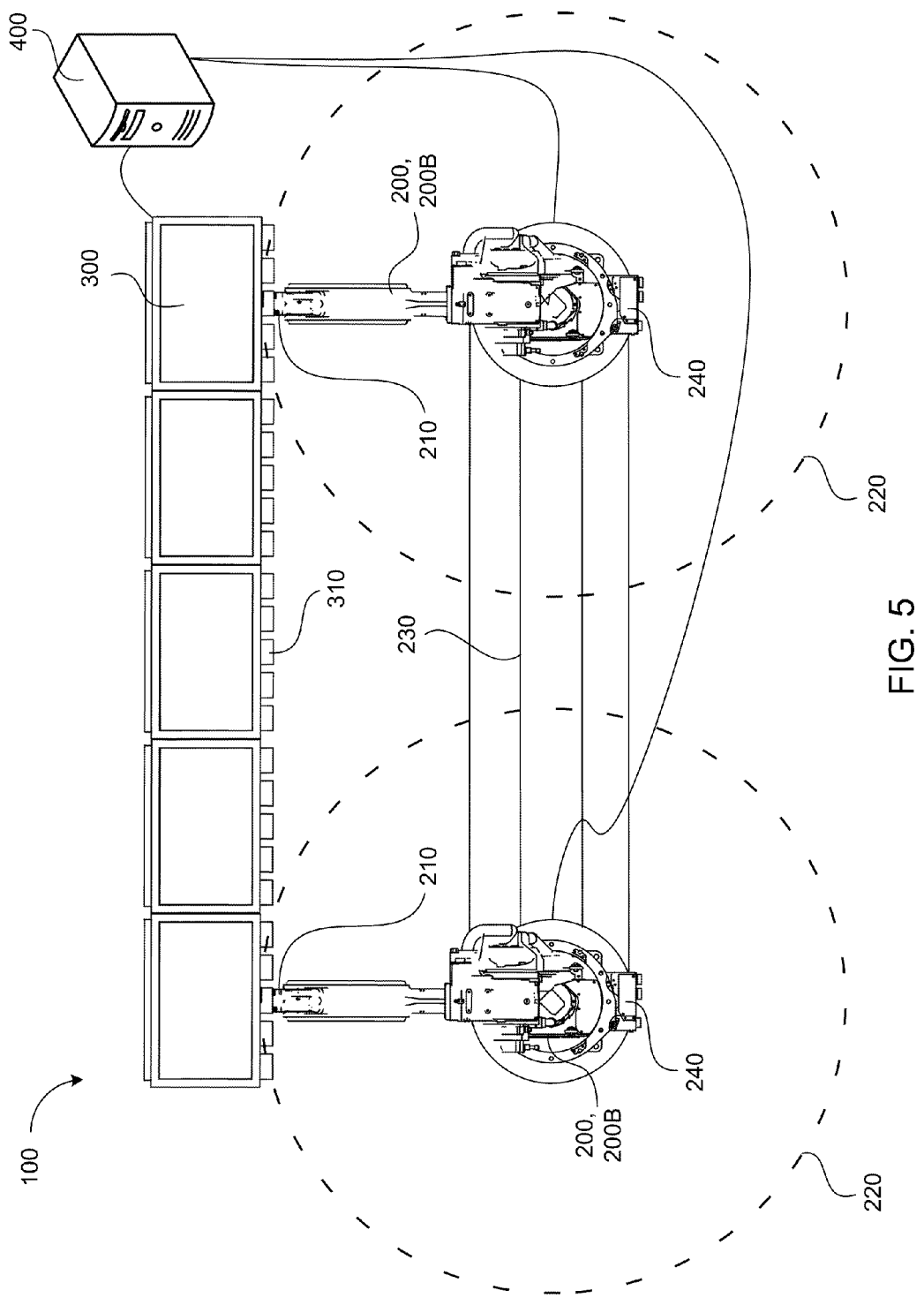
FIG. 5 is a top view of the storage device testing system shown in FIG. 4.

Referring to FIGS. 4 and 5, in some implementations, the storage device processing system 100 includes at least one automated transporter 200 (e.g., robotic arm, gantry system, or multi-axis linear actuator) disposed on a guide system 220. In the example shown, first and second automated transporters 200A, 200B, shown as robotic arms, are disposed on the guide system 230. Multiple racks 300 are arranged substantially in a row for servicing by the robotic arm(s) 200. Each rack 300 houses multiple test slots 310 configured to receive storage devices 500 for testing (e.g., diagnostic, connectivity, and/or performance testing). A controller 400 (e.g., computing device) communicates with each robotic arm 200 and rack 300. The controller 400 coordinates servicing of the test slots 310 by the robotic arm(s) 200. For example, the controller 400 can execute programs or instructions communicated to it or stored in memory thereon for moving the robotic arms 200 along the guide system 230. The controller 400 tracks the movements of the robotic arms 200 and prevents collisions.

In some implementations, the guide system 230 includes a linear actuator configured to move an associated robotic arm 200 adjacently along the racks 300 to allow the associated robotic arm 200 to service test slots 310 of more than one rack 300. In other implementations, each robotic arm 200 includes a drive system 240 configured to move the robotic arm 200 along the guide system 230. For example, the robotic arm 200 may be mounted on a rail system 230 and the drive system 240 moves the robotic arm 200 along the rail system 230. The guide system 230 may be scalable (e.g., in length) and may accommodate multiple robotic arms 200, for example, to support either longer racks 300 or to further reduce the area serviced by each automated transporter 200 to increase throughput and/or accommodate shorter testing times. In the examples shown, the robotic arm 200 is operable to rotate through a predetermined arc about a longitudinal axis 205 defined by the robotic arm 200 and to extend radially from the first axis 205. The robotic arm 200 is operable to rotate 360° about the first axis 205 and includes a manipulator 210 disposed at a distal end 202 of the robotic arm 200 to handle one or more storage devices 500 and/or storage device transporters 550 that carry the storage devices 500 (see e.g. FIGS. 5-6). In some examples, the processing system 100 includes multiple guide systems 220 that each support one or more robotic arms 200. The robotic arms 200 on each guide system 220 may be instructed to service adjacent racks 300 and associated test slots 310.

In some implementations, the robotic arm 200 is configured to independently service each test slot 310 to provide a continuous flow of storage devices 500 through the processing system 100. A continuous flow of individual storage devices 500 through the processing system 100 allows random start and stop times for each storage device 500. Therefore, with continuous flow, storage devices 500 of different capacities can be run at the same time and serviced (e.g., loaded/unloaded) as needed. In other implementations, the processing system 100 tests batches of storage devices 500 all at once, where an entire batch of loaded storage devices start and end at substantially the same time.

The processing system 100 overcomes mechanical speed constraints of the robotic arm 200 which limit overall testing throughput by the inclusion of multiple robotic arms 200 servicing the test slots 310. Each robotic arm 200 may be assigned a work zone 250 that includes a group of test slots 310 across one or more racks 300 for servicing by that robotic arm 200. Each robotic arm 200 may service a partial number of the overall number of test slots 310 that correspond to its assign work zone 250. The work zone 250 assigned to each robotic arm 200 may encompass only test slots 310 that receive certain types of storage devices 500 and/or to certain types of testing. In some examples, the work zone 250 includes test slots only within a certain area on the rack(s) 300 (e.g., directly adjacent the robotic arm 200, upper or lower regions of the rack 300, or optimized groupings of test slots 310 determined by the controller 400). The processing system 100 may be configured such that the work zones 250 designate preferred, rather than exclusive, test slots 310 for servicing by respective robotic arms 200. In some instances, the multiple work zones 250 overlap with each other, so that if one automated transporter 200 fails, adjacent robotic arms 200 can service the test slots 310 of the work zone 250 associated with the failed robotic arm 200. In the example shown, the first robotic arm 200A services a first work zone 250A and the second robotic arm 200B services a second works on 250B. Each work zone 250, 250A, 250B may be defined by the operating envelope 220 of the associated robotic arm 200, 200A, 200B (e.g., all of the test slots 310 accessible by the manipulator 210 of the associated robotic arm 200, 200A, 200B).

In implementations that employ storage device transporters 550 for manipulating storage devices 500, as shown in FIG. 4, the robotic arm 200 is configured to remove a storage device transporter 550 from one of the test slots 310 with the manipulator 210, then pick up a storage device 500 from one the totes 700 presented at the transfer station 600 or other presentation system (e.g., conveyor, loading/unloading station, etc.) with the storage device transporter 550, and then return the storage device transporter 550, with a storage device 500 therein, to the test slot 310 for testing of the storage device 500. After testing, the robotic arm 200 retrieves the tested storage device 500 from the test slot 310, by removing the storage device transporter 550 carrying the tested storage device 500 from the test slot 310 (i.e., with the manipulator 210), carrying the tested storage device 500 in the storage device transporter 550 to the transfer station 600, and manipulating the storage device transporter 550 to return the tested storage device 500 to one of the totes 700 at the transfer station 600 or other system (e.g., conveyor, loading/unloading station, etc.).

Figure 7:
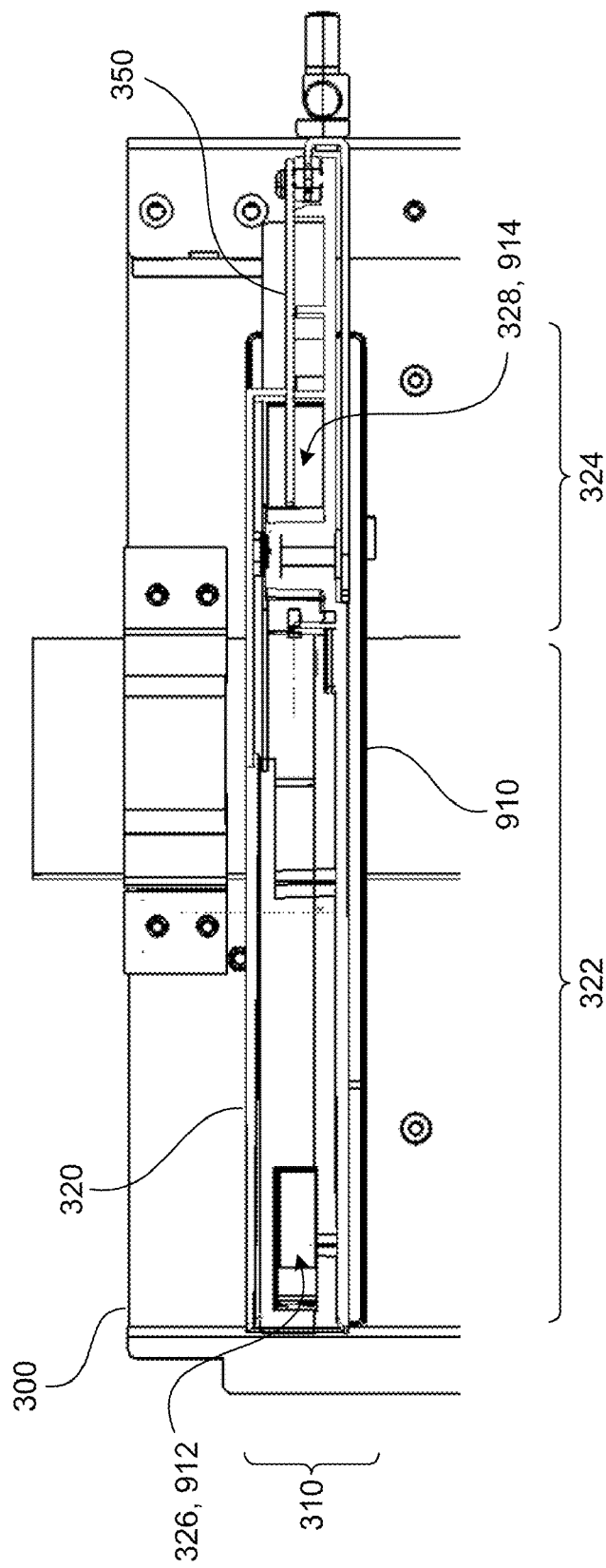
FIG. 7 is a sectional view of a test slot along line 7-7 in FIG. 6A.
Figure 8:
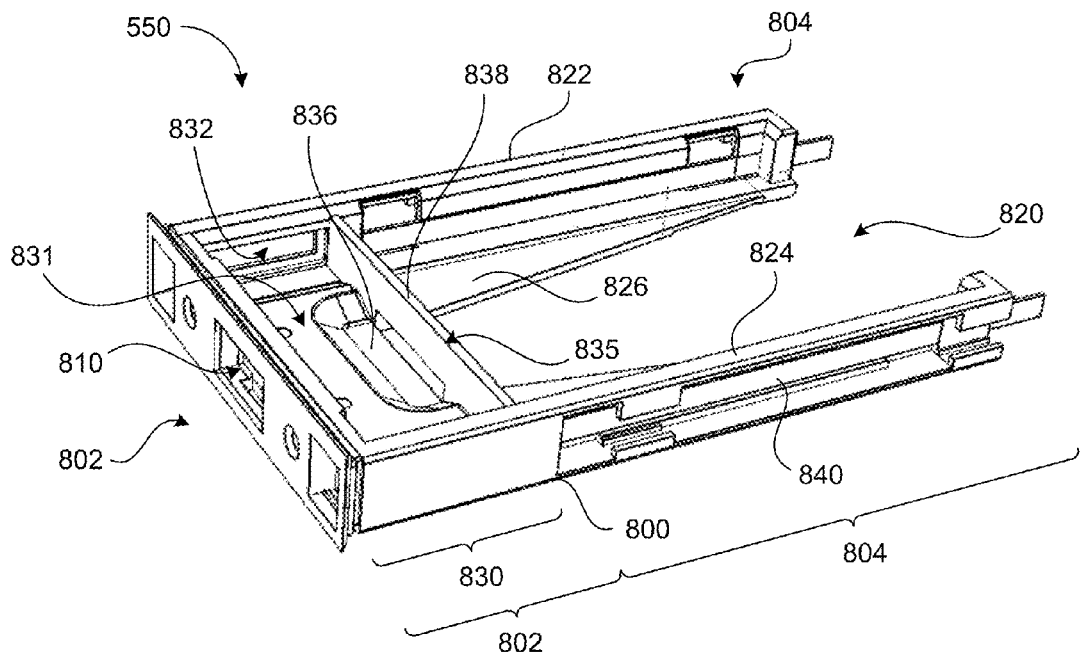
FIG. 8 is a side perspective view of a storage device transporter.
Figure 9:
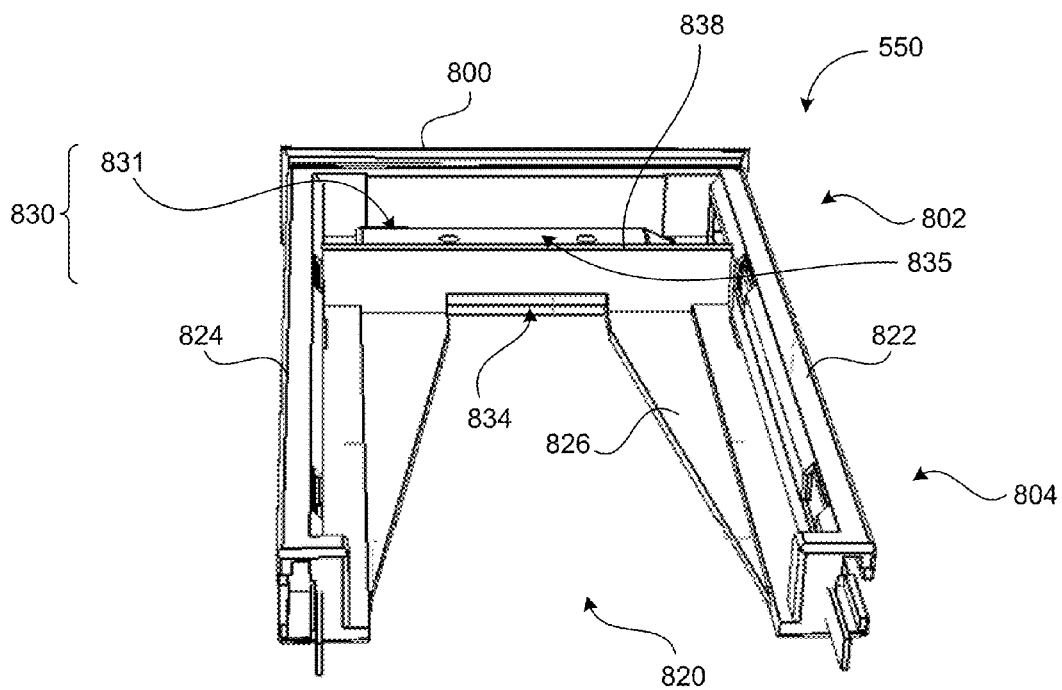
FIG. 9 is a front perspective view of a storage device transporter.
Figure 10:
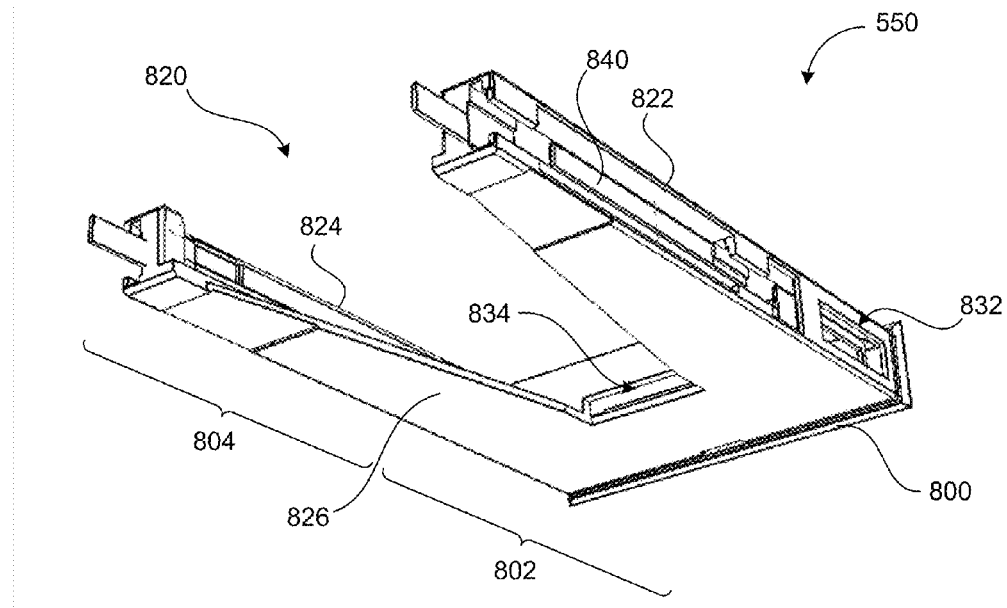
FIG. 10 is a bottom perspective view of a storage device transporter.

In the examples illustrated in FIGS. 6A-7, each test slot 310 is configured to receive the storage device transporter 550. The storage device transporter 550 is configured to receive the storage device 500 and be handled by the manipulator 210 of the robotic arm 200. In use, one of the storage device transporters 550 is removed from or delivered to one of the test slots 310 by the robotic arm 200. Each test slot 310 includes a test slot housing 320 received by the rack 300 and having first and second portions 322, 324. The first portion 322 of the test slot housing 320 defines a device opening 325 sized to receive a storage device 500 and/or a storage device transporter 550 carrying the storage device 500 as well as a first air opening 326 (i.e., air entrance). The second portion 324 of the test slot housing 320 defines a second air opening 328 (i.e., air exit) and houses electronics 350.

Figure 11:
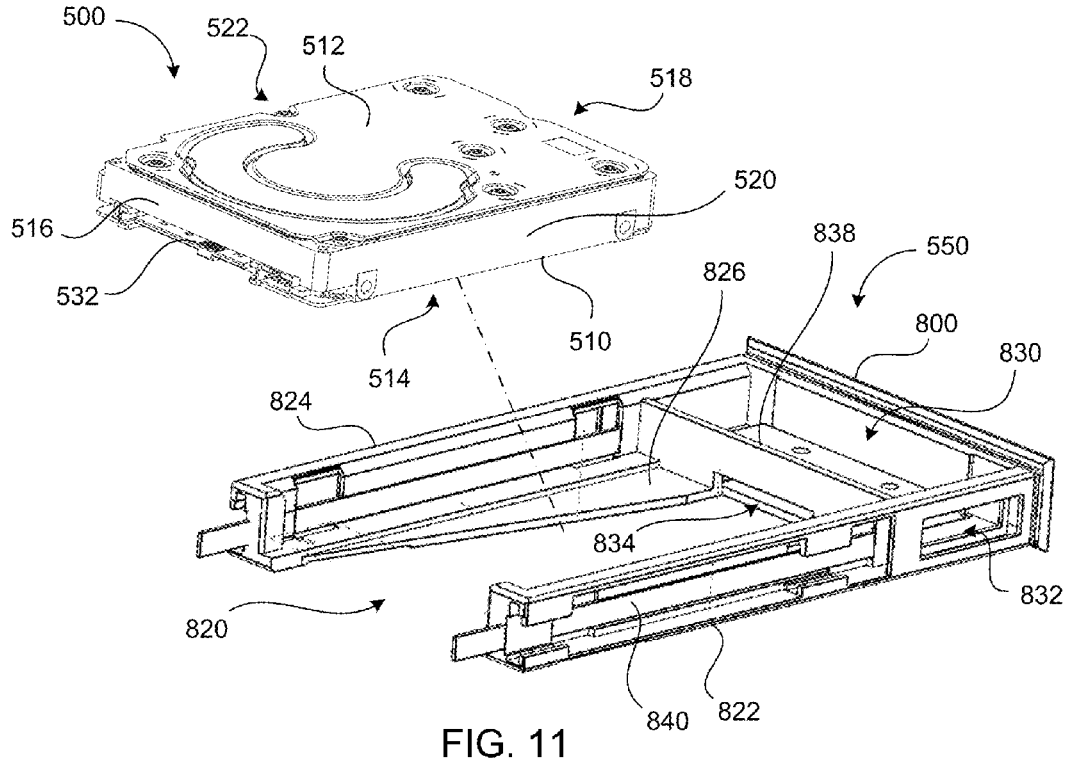
FIG. 11 is a perspective view of a storage device transporter receiving a storage device.

As illustrated in FIGS. 8-11, the storage device transporter 550 includes a transporter body 800 having first and second portions 802, 804. The first portion 802 of the transporter body 800 includes a manipulation feature 810 (e.g., indention, protrusion, etc.) configured to receive or otherwise be engaged by the manipulator 210 for transporting. The second portion 804 of the transporter body 800 is configured to receive a storage device 500. In some examples, the second transporter body portion 804 defines a substantially U-shaped opening 820 formed by first and second sidewalls 822, 824 and a base plate 826 of the transporter body 800. The storage device 500 is received in the U-shaped opening 820 and supported by at least the base plate 826. FIG. 11 illustrates an exemplary storage device 500 that includes a housing 510 having top, bottom, front, rear, left and right surfaces 512, 514, 516, 518, 520, 522. The storage device 500 is typically received with its rear surface 518 substantially facing the first portion 802 of the storage device transporter body 800. The first portion 802 of the transporter body 800 includes an air director 830 that receives and directs air substantially simultaneously (e.g., in parallel) over at least the top and bottom surfaces 512, 514 of the storage device 500 received in the storage device transporter 550. The air director 830 defines an air cavity 831 having an air entrance 832 and first and second air exits 834, 835. The air director 830 directs air received through its air entrance 832 out of the first and second air exits 834, 835. The first air exit 834 directs air over the top surface 512 of the received storage device 500 and the second air exit 835 directs air over the bottom surface 514 of the received storage device 500.

In some implementations, the air director 830 includes a plenum 836 disposed in the cavity 831 for directing at least a portion of the air received through the air entrance 832 out through the first air exit 834 and over at least the bottom surface 514 of the received storage device 500. In some implementations, the air director 830 is weighted to stabilize the storage device transporter 550 against vibration. For example, the plenum 836 can be weighted or fabricated of a material having a suitable weight. Air entering into the air cavity 831 can also flow over a partition 838 (above which is the second air exit 835) to flow over at least the top surface 512 of the storage device 500. With the storage device 500 received within the transporter body 800, the storage device transporter 550 and the storage device 500 together can be moved by the automated transporter 200 for placement within one of the test slots 310.

Some storage devices 500 can be sensitive to vibrations. Fitting multiple storage devices 500 in a single test rack 310 and running the storage devices 500 (e.g., during testing), as well as the insertion and removal of the storage device transporters 550, each optionally carrying a storage device 500, from the various test slots 310 in the test rack 300 can be sources of undesirable vibration. In some cases, for example, one of the storage devices 500 may be operating under test within one of the test slots 310, while others are being removed and inserted into adjacent test slots 310 in the same rack 300. Clamping the storage device transporter 550 to the test slot 310 after the storage device transporter 550 is fully inserted into the test slot 310 can help to reduce or limit vibrations by limiting the contact and scraping between the storage device transporters 550 and the test slots 310 during insertion and removal of the storage device transporters 550.

In some implementations, the manipulator 210 is configured to initiate actuation of a clamping mechanism 840 disposed in the storage device transporter 550. This allows actuation of the clamping mechanism 840 before the storage device transporter 550 is moved to and from the test slot 310 to inhibit movement of the storage device 500 relative to the storage device transporter 550 during the move. Prior to insertion in the test slot 310, the manipulator 210 can again actuate the clamping mechanism 840 to release the storage device 500 within the transporter body 800. This allows for insertion of the storage device transporter 550 into one of the test slots 310, until the storage device 500 is in a test position engaged with the test slot 310 (e.g., a storage device connector 532 of the storage device 500 (FIG. 11) is engaged with a test slot connector 352 (FIG. 12) of the test slot 310). The clamping mechanism 840 may also be configured to engage the test slot 310, once received therein, to inhibit movement of the storage device transporter 550 relative to the test slot 310. In such implementations, once the storage device 500 is in the test position, the clamping mechanism 840 is engaged again (e.g., by the manipulator 210) to inhibit movement of the storage device transporter 550 relative to the test slot 310. The clamping of the storage device transporter 550 in this manner can help to reduce vibrations during testing. In some examples, after insertion, the storage device transporter 550 and storage device 500 carried therein are both clamped or secured in combination or individually within the test slot 310. A detailed description of the storage device transporter 550 and other details and features combinable with those described herein may be found in the following U.S. patent applications filed concurrently herewith, entitled "Conductive Heating", inventors: Brian Merrow et al., and having assigned Ser. No. 12/503,593, and entitled "Storage Device Temperature Sensing", inventors: Brian Merrow et al., and having assigned Ser. No. 12/505,687. The entire contents of these applications are hereby incorporated by reference.

Figure 12:
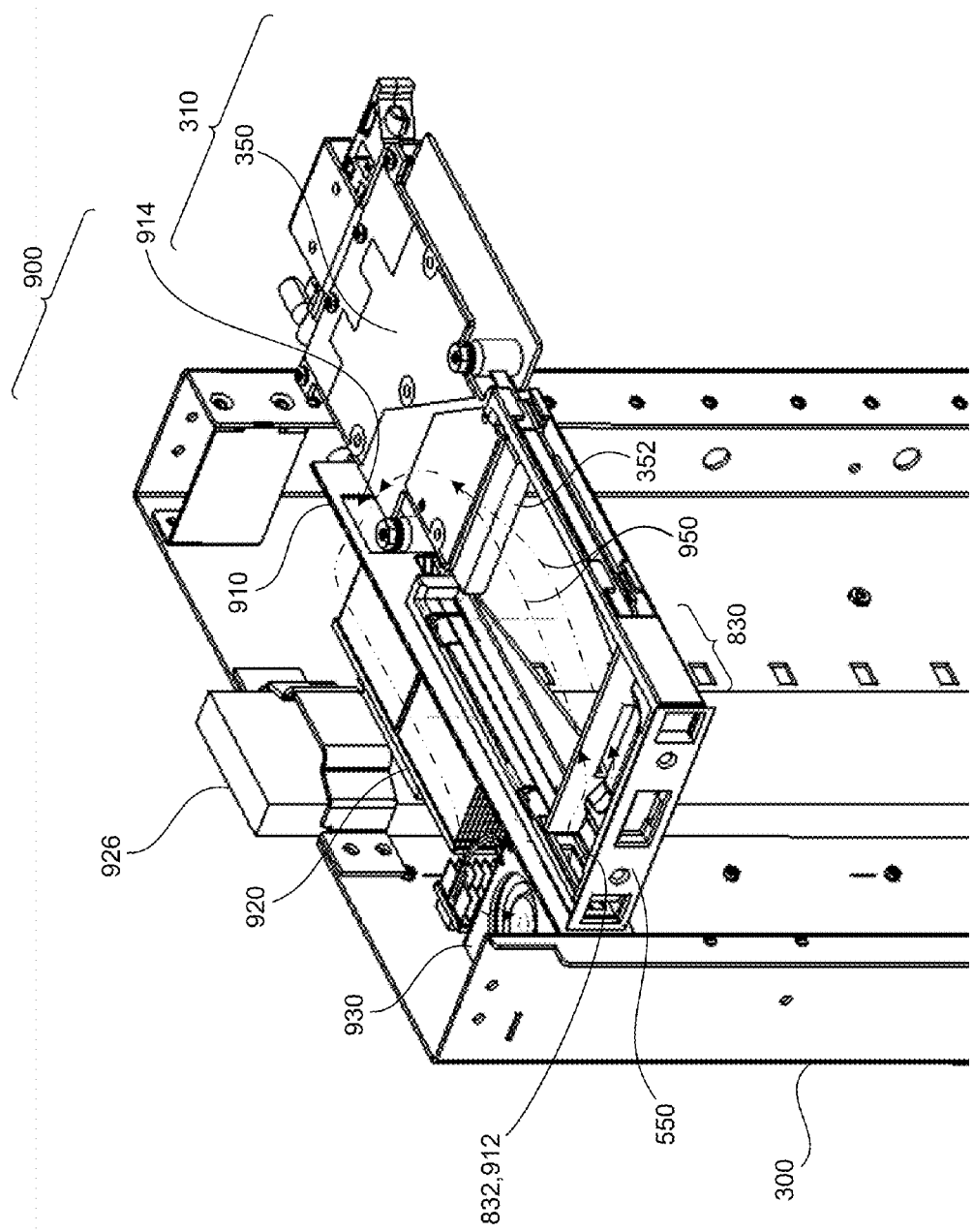
FIG. 12 is a perspective view of a test slot and a test slot cooling system in a rack of a storage device testing system.
Figure 13:
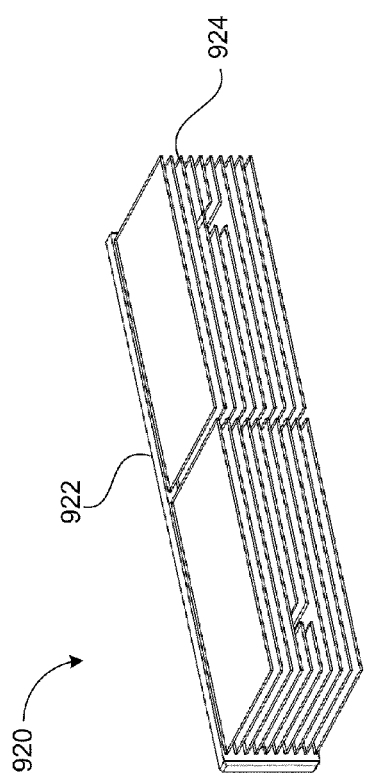
FIG. 13 is a perspective view of an air cooler.

Referring again to FIGS. 6A-7 as well as FIG. 12, the rack 300 includes a test slot cooling system 900 disposed adjacent to each test slot 310. The test slot cooling system 900 includes a housing 910 having first and second air openings 912, 914 (i.e., air exit and air entrance). The housing 910 receives air from the test slot 310 through the second air opening 914 and directs the air through an air cooler 920 to an air mover 930 (e.g., blower, fan, etc.). In the example shown in FIG. 13, the air cooler 920 includes an air cooler body 922 having one or more fins or plates 924 disposed thereon. The air cooler 920 is coupled or attached to a cooling tube 926 through which a chilled liquid (e.g., water) flows. The chilled cooling tube 926 conducts heat from the air cooler 920 which receives heat through convection from air flowing over the fins 924. The air mover 930 moves the air through the first air opening 912 back into the test slot 310 through its first air opening 326. The first air opening 326 of the test slot housing 320 is substantially aligned with the first air opening 912 of the test slot cooling system housing 900, and the second air opening 328 of the test slot housing 320 is substantially aligned with the second air opening 914 of the test slot cooling system housing 900. In examples using the storage device transporter 550, the first air opening 326 of the test slot housing 320 is substantially aligned with the air entrance 832 of the transporter body 800 for delivering temperature controlled air over a storage device 500 carried by the storage device transporter 550.

Figure 14:
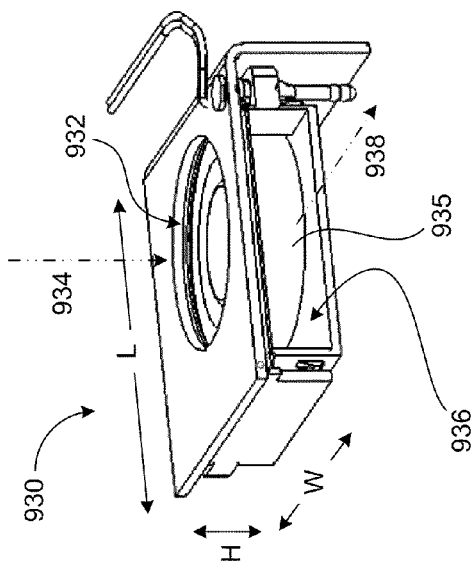
FIG. 14 is a perspective view of an air mover.

FIG. 14 illustrates an exemplary air mover 930 which has an air entrance 932 that receives air along a first direction 934 and an air exit 936 that delivers air along a second direction 938 substantially perpendicular to the first direction. Changing the direction of air movement within the air mover 930 eliminates the efficiency loss of changing the air flow direction within a conduit, thereby increasing the cooling efficiency of the test slot cooling system 900. In some implementations, the air mover 930 includes an impeller 935 rotating at about 7100 revolutions per minute (rpm) to produce an air flow rate of up to about 0.122 m$^3$/min (4.308 CFM) (at zero static pressure) and an air pressure of up to about 20.88 mmH$_2$O (0.822 inchH$_2$O) (at zero air flow). In some instances, the air mover 930 is largest component of the test slot cooling system 900 and therefore dictates the size of the test slot cooling system 900. In some implementations, the air mover 930 has length L of about 45 mm, a width W of about 45 mm, and a height H of about 10 mm, such as DC Blower BFB04512HHA-8A60 provided by Delta Electronics, Inc., Taoyuan Plant, 252 Shang Ying Road, Kuei San Industrial Zone, Yaoyuan Shien, Taiwan R.O.C. The substantially horizontal placement of the air mover 930 within the test slot cooling system 900 allows for a relatively lower overall height of the test slot cooling system 900, and therefore a relatively lower overall height of an associated test slot 310 (allowing greater test slot density in the rack 300). The ability of the air mover 930 to redirect the air flow path 925 (FIG. 15) reduces air resistance in the air flow path 925, thereby lowering the power consumption of the air mover 930 to maintain a threshold air flow rate.

Figure 15:
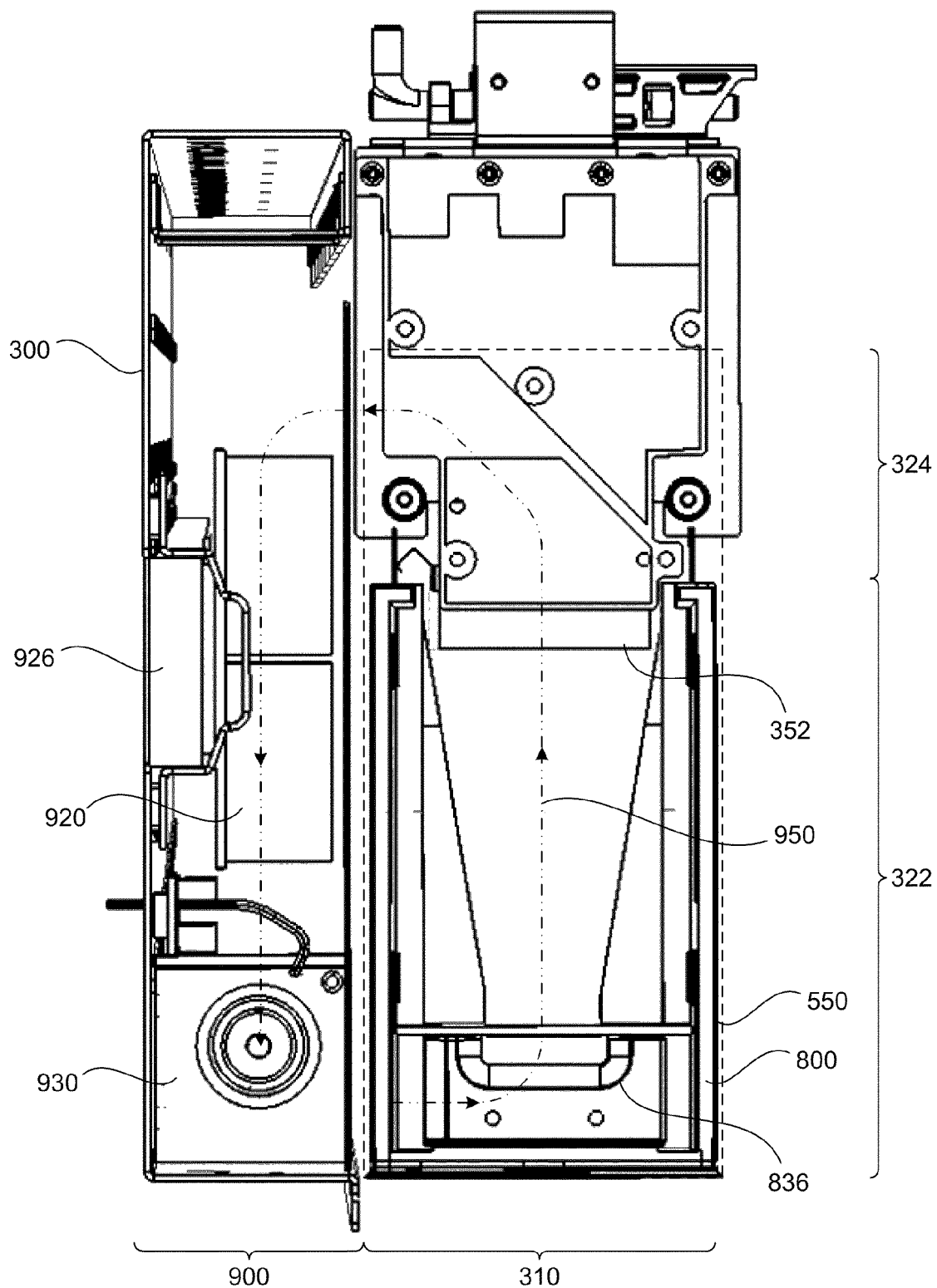
FIG. 15 is a top view of a test slot and a test slot cooling system in a rack of a storage device testing system showing an air flow path through the test slot and a test slot cooling system.
Figure 16:
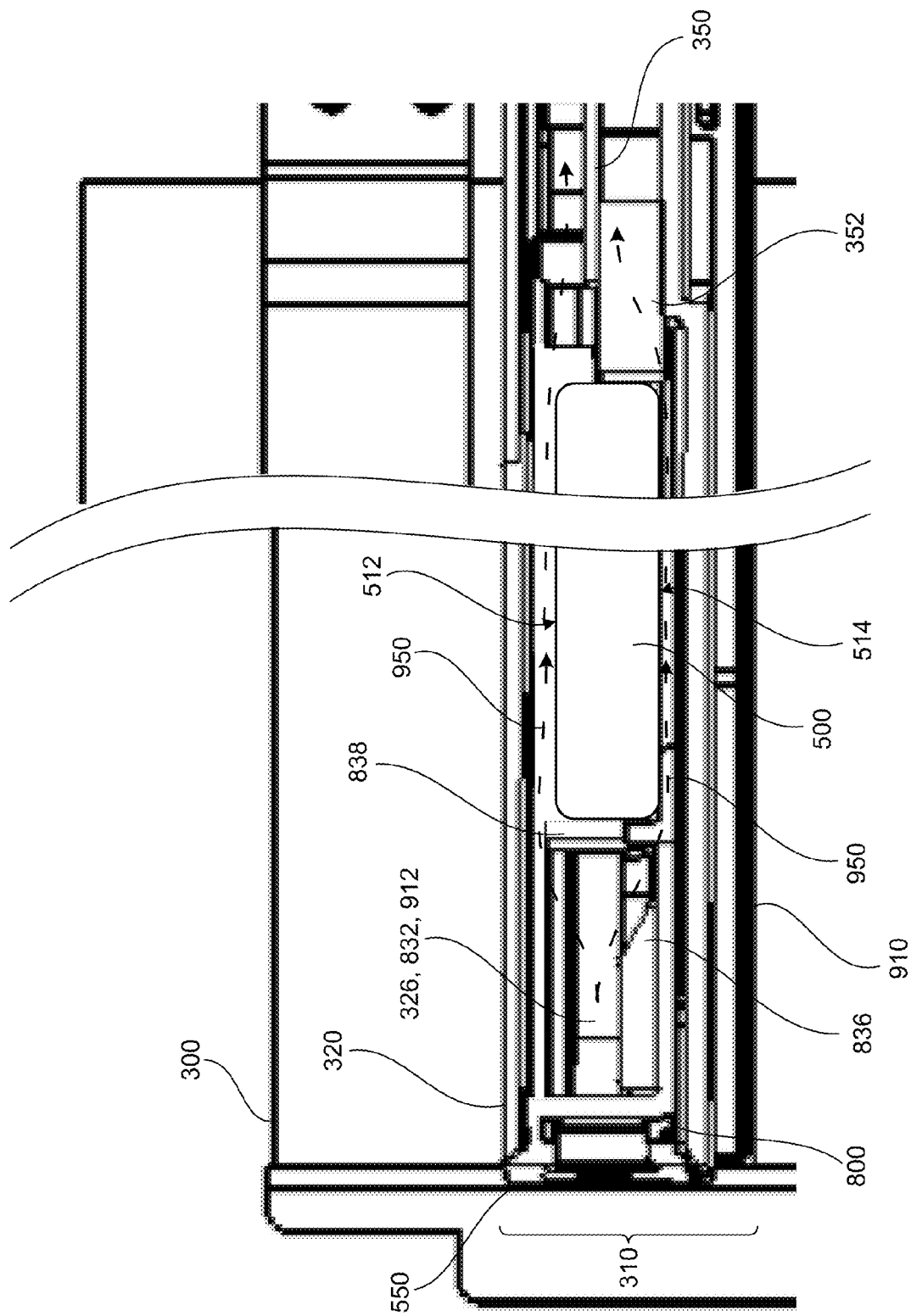
FIG. 16 is a side sectional view of a test slot showing an air flow path over the top and bottom surfaces of a storage device received in the test slot.

FIG. 15 provides a top view of the rack 300 and illustrates the air flow path 950 through the test slot cooling system 900 and the test slot 310. FIG. 16 provides a side sectional view of the test slot 310 and the air flow path 950 over the top and bottom surfaces 512, 514 of the received storage device 500. The air may also flow over other surfaces of the storage device 500 (e.g., front, back, left and right sides 516, 518, 520, 522). The air mover 930 delivers air through the first air opening 912 (i.e., air entrance) of the test slot cooling system housing 900 and the first air opening 326 (i.e., air entrance) of the test slot housing 320 into the air director 830 of the storage device transporter body 800. The air flows through the air entrance 832 of the air director 830 in to the air cavity 831. The air flows out of the first air exit 834 of the air director 830 (e.g., as directed by the plenum 836) and over at least the bottom surface 514 of the storage device 500. The air also flows through the second air exit 835 (e.g., over the partition 838) and over at least the top surface 512 of the storage device 500. The air moves from the first portion 322 of the test slot housing 320 to the second portion 324 of the test slot housing 320. The air may move over the electronics 350 in the second portion 324 of the test slot housing 320. The air exits the test slot housing 320 through its second air opening 328 (i.e., air exit) into the second air opening 914 (i.e., air entrance) of the test slot cooling system housing 900. The air travels over the air cooler 920 (e.g., over the air cooler fins 924) which is disposed in or adjacent to the air flow path 925 and then back into the air entrance 932 of the air mover 930.

In the examples shown, the storage device transporter 550 provides closure of the device opening 325 of the test slot housing 320 once received therein. The air director 830 of the storage device transporter 550 as well as the air mover 930 are situated near the inlet of the device opening 325 of the test slot housing 320. As the air mover 930 moves the air to circulate along the air path 950, the air moves from the first portion 322 of the test slot housing 320 along a common direction to the second portion 324 of the test slot housing 320 while traversing the entire length of the received storage device 500. Since the air moves substantially concurrently along at least the top and bottom surfaces 512, 514 of the storage device 500, the air provides substantially even cooling of the storage device 500. If the air was routed along once side of the storage device first, such as the top surface 512, and then directed along another side sequentially second, such as the bottom surface 514, the air would become preheated after passing over the first side of the storage device 500 before passing over any additional sides of the storage device, thereby providing relatively less efficient cooling than flowing air over two or more sides of the storage device 500 substantially concurrently and/or without recirculation over the storage device 500 before passing through the air cooler 920.

A method of performing storage device testing includes presenting one or more storage devices 500 to a storage device testing system 100 for testing at a source location (e.g., a loading/unloading station 600, storage device tote 700, test slot(s) 310, etc.) and actuating an automated transporter 200 (e.g. robotic arm) to retrieve one or more storage devices 500 from the source location and deliver the retrieved storage device(s) 500 to corresponding test slots 310 disposed on a rack 300 of the storage device testing system 100. The method includes actuating the automated transporter 200 to insert each retrieved storage device 500 in its respective test slot 310, and performing a test (e.g., functionality, power, connectivity, etc.) on the storage devices 500 received by the test slot 310. The method may also include actuating the automated transporter 200 to retrieve the tested storage device(s) 500 from the test slot(s) 310 and deliver the tested storage device(s) 500 to a destination location (e.g., another test slot 310, a storage device tote 700, a loading/unloading station 600, etc).

A method of regulating the temperature of a storage device 500 received in a storage device testing system 100 includes delivering a flow of air into an air entrance 326 of a test slot housing 320 and directing the air flow substantially simultaneously over at least the top and bottom surfaces 512, 514 of the storage device 500. The method may include delivering the air flow to an air director 830 that directs the air flow over at least the top and bottom surfaces 512, 514 of the storage device 500. In some implementations, the method includes supporting the storage device 500 in a storage device transporter 550 received in the test slot housing 320. The storage device transporter 550 includes a body 800 having first and second portions 802, 804. The first storage device transporter body portion 802 includes the air director 830 and the second storage device transporter body portion 804 is configured to receive the storage device 500. The storage device 500 has top, bottom, front, rear, right, and left side surfaces 512, 514, 516, 518, 520, 522 and is received with its rear surface 518 substantially facing the first body portion 802 of the storage device transporter body 800. The method may include weighting the air director 830, in some examples the plenum 836) to reduce movement of the storage device transporter while received by the storage device testing system.

In some implementations, the method includes delivering the air flow into an air entrance 832 of the air director 830. The air director 830 directs the air received through the air entrance 832 out first and second air exits 834, 835 of the air director 830. The first air exit 834 directs air over at least the bottom surface 514 of the received storage device 500 and the second air exit 835 directs air over at least the top surface 512 of the received storage device 500. The air director 830 may define a cavity 831 in pneumatic communication with the air entrance 832 and air exits 834, 835 of the air director 830. The air director 830 includes a plenum 836 disposed in the cavity 831 for directing at least a portion of the air received in the cavity 831 out of the first air exit 834. In some examples, the method includes weighting the plenum 836 to reduce movement of the storage device transporter 550 while received by the storage device testing system 100 (e.g., while received in the test slot 310).

In some implementations, the method includes directing the flow of air to an air mover 930 in pneumatic communication with the air entrance 326 of the test slot housing 320. The air mover 930 delivers the flow of air into the air entrance 326 of a test slot housing 320 with the air flow moving along a closed loop path 950 (FIG. 15). The method may include receiving the flow of air into the air mover 930 along a first direction 934 and delivering the air flow to the air entrance 326 of the test slot housing 320 along a second direction 938 substantially perpendicular to the first direction 934. The method includes directing the flow of air over an air cooler 920 disposed in the air flow path 950 upstream of the air mover 930. In some examples, the method includes delivering the air flow into the air entrance 326 of the test slot housing 320 (e.g., via the air mover 930) at an air flow rate of up to about 0.122 m3/min (4.308 CFM) and an air pressure of up to about 20.88 mmH2O (0.822 inchH2O).

A number of implementations have been described. Nevertheless, it will be understood that various modifications may be made without departing from the spirit and scope of the disclosure. Accordingly, other implementations are within the scope of the following claims.

What is claimed is:

1. A test slot cooling system for a storage device testing system, the test slot cooling system comprising:
   a storage device transporter comprising a first portion and a second portion, the first portion of the storage device transporter comprising an air director, the second portion of the storage device transporter configured to receive a storage device;
   a test slot housing defining an air entrance and a transporter opening for receiving the storage device transporter, the air entrance configured for pneumatic communication with the air director of the storage device transporter received in the transporter opening of the test slot housing; and
   an air mover configured for pneumatic communication with the air entrance of the test slot housing for delivering air to the air director,
   wherein the air director is configured to direct the air substantially simultaneously over at least top and bottom surfaces of the storage device received in the second portion of the storage device transporter, and
   wherein a plenum comprises a weight configured to reduce movement of the storage device transporter in the test slot housing.

2. The test slot cooling system of claim 1, wherein the air mover comprises an air mover body having a width of about 45 mm, a length of about 45 mm, and a height of about 10 mm.

3. The test slot cooling system of claim 1, wherein the air mover is further configured to produce an air flow rate of up to about 0.122 m³/min (4.308 CFM) and an air pressure of up to about 20.88 mmH₂O (0.822 inchH₂O).

4. A test slot cooling system for a storage device testing system, the test slot cooling system comprising:
a test slot housing defining an air entrance and a device opening configured to receive a storage device; and
an air mover configured for pneumatic communication with the air entrance of the test slot housing, the air mover configured to deliver air to the storage device received in the device opening of the test slot housing,
wherein the air mover comprises an air entrance and an air exit, the air exit of the air mover is configured for pneumatic communication with the air entrance of the test slot housing, the air mover is configured to receive air along a first direction through the air entrance of the air mover and is further configured to deliver the air out of the air exit of the air mover along a second direction substantially perpendicular to the first direction.

5. The test slot cooling system of claim 4, wherein the test slot housing comprises an air exit, and wherein the test slot cooling system further comprises:
a cooling system housing comprising:
an air entrance configured for pneumatic communication with the air exit of the test slot housing; and
an air exit configured for pneumatic communication with the air entrance of the test slot housing,
wherein the air mover is configured to circulate air received through the air entrance of the cooling system housing out of the air exit of the cooling system housing, with the air being circulated along a closed loop path through the test slot housing and the cooling system housing.

6. The test slot cooling system of claim 4, wherein the air mover comprises an air mover body having a width of about 45 mm, a length of about 45 mm, and a height of about 10 mm.

7. The test slot cooling system of claim 4, wherein the air mover is further configured to produce an air flow rate of up to about 0.122 m³/min (4.308 CFM) and an air pressure of up to about 20.88 mmH₂O (0.822 inchH₂O).

8. The test slot cooling system of claim 4, further comprising:
an air cooler configured for pneumatic communication with the air mover,
wherein the air cooler comprises an air cooler body and at least one fin disposed on the air cooler body, the at least one fin configured to cool the air in the test slot housing.

9. A storage device transporter for a storage device testing system, the storage device transporter comprising:
a body comprising a first portion and a second portion, the first portion comprising an air director, the second portion configured to receive a storage device comprising top, bottom, front, rear, right, and left side surfaces, the storage device being received in the second portion of the body with a rear surface of the storage device substantially facing the first portion of the body,
wherein the air director is configured to receive an air flow and is further configured to direct the air flow substantially simultaneously over at least top and bottom surfaces of the storage device received in the storage device transporter.

10. The storage device transporter of claim 9, wherein:
the air director comprises an air entrance, a first air exit and a second air exit,
the air director is configured to direct air received through the air entrance out of the first and the second air exits,
the first air exit is configured to direct the air over at least a bottom surface of the storage device received in the storage device transporter, and
the second air exit is configured to direct the air over at least a top surface of the storage device received in the storage device transporter.

11. The storage device transporter of claim 9, wherein:
the air director comprises an air entrance, a first air exit and a second air exit,
the air director defines a cavity configured for pneumatic communication with the air entrance, the first air exit and the second air exit,
the air director further comprises a plenum disposed in the cavity, and
the plenum is configured to direct at least a portion of air received in the cavity out of the first air exit.

12. The storage device transporter of claim 11, wherein the plenum comprises a weight configured to reduce movement of the storage device transporter received by the storage device testing system.

13. A method of regulating the temperature of a storage device received in a storage device testing system, the method comprising:
delivering an air flow into an air entrance of a test slot housing of the storage device testing system;
directing the air flow substantially simultaneously over at least top and bottom surfaces of the storage device in a storage device transporter; and
weighting a plenum to reduce movement of the storage device transporter received by the storage device testing system.

14. The method of claim 13, further comprising delivering the air flow to an air director that is configured to direct the air flow over at least the top and bottom surfaces of the storage device.

15. The method of claim 14, further comprising supporting the storage device in the storage device transporter received in the test slot housing, the storage device transporter comprising first and second portions, the first portion comprising the air director, the second portion configured to receive the storage device, the storage device comprising top, bottom, front, rear, right, and left side surfaces and configured to be received in the second portion of the storage device transporter with a rear surface of the storage device substantially facing the first portion of the storage device transporter.

16. The method of claim 14, further comprising:
delivering the air flow into an air entrance of the air director,
wherein the air director is configured to direct air received through the air entrance out first and second air exits of the air director, the first air exit is configured to direct air over at least a bottom surface of the storage device received in the storage device testing system, and the second air exit is configured to direct air over at least a top surface of the storage device received in the storage device testing system.

17. The method of claim 16, wherein:
the air director defines a cavity configured for pneumatic communication with the air entrance and the first and second air exits of the air director,
the air director comprises a plenum disposed in the cavity, and
the plenum is configured to direct at least a portion of air received in the cavity out of the first air exit.

18. A method of regulating the temperature of a storage device received in a storage device testing system, the method comprising:

delivering an air flow into an air entrance of a test slot housing;

delivering the air flow to an air director of the test slot housing that is configured to direct the air flow over at least top and bottom surfaces of the storage device;

directing the air flow substantially simultaneously over at least the top and bottom surfaces of the storage device;

supporting the storage device in a storage device transporter received in the test slot housing, the storage device transporter comprising a first portion and a second portion, the first portion comprising the air director, the second portion configured to receive the storage device, the storage device comprising top, bottom, front, rear, right, and left side surfaces and configured to be received in the second portion of the storage device transporter with a rear surface of the storage device substantially facing the first portion of the storage device transporter; and weighting the air director to reduce movement of the storage device transporter received by the storage device testing system.

19. The method of claim 13, further comprising:

directing the air flow to an air mover configured for pneumatic communication with the air entrance of the test slot housing, wherein the air mover is configured to deliver the air flow into the air entrance of the test slot housing, with the air flow moving along a closed loop path in the test slot housing.

20. The method of claim 19, further comprising receiving the air flow into the air mover along a first direction and delivering the air flow to the air entrance of the test slot housing along a second direction substantially perpendicular to the first direction.

21. The method of claim 19, further comprising directing the air flow over an air cooler disposed in an air flow path upstream of the air mover.

22. The method of claim 13, further comprising delivering the air flow into the air entrance of the test slot housing at an air flow rate of up to about 0.122 m$^3$/min (4.308 CFM) and an air pressure of up to about 20.88 mmH$_2$O (0.822 inchH$_2$O).

* * * * *